US010073585B2

(12) United States Patent
Kanda et al.

(10) Patent No.: US 10,073,585 B2
(45) Date of Patent: Sep. 11, 2018

(54) ELECTRONIC DEVICE, STORAGE MEDIUM AND METHOD FOR OPERATING ELECTRONIC DEVICE

(71) Applicant: KYOCERA Corporation, Kyoto-shi, Kyoto (JP)

(72) Inventors: Atsuhiko Kanda, Yokohama (JP); Hayato Takenouchi, Kizugawa (JP)

(73) Assignee: KYOCERA Corporation, Kyoto (JP)

( * ) Notice: Subject to any disclaimer, the term of this patent is extended or adjusted under 35 U.S.C. 154(b) by 156 days.

(21) Appl. No.: 14/699,799

(22) Filed: Apr. 29, 2015

(65) Prior Publication Data
US 2015/0234566 A1 Aug. 20, 2015

Related U.S. Application Data

(63) Continuation of application No. PCT/JP2013/078924, filed on Oct. 25, 2013.

(30) Foreign Application Priority Data

Oct. 29, 2012 (JP) .................................. 2012-238144

(51) Int. Cl.
G06F 3/0481 (2013.01)
G06F 3/038 (2013.01)

(52) U.S. Cl.
CPC .......... G06F 3/04812 (2013.01); G06F 3/038 (2013.01); *G06F 2203/04801* (2013.01)

(58) Field of Classification Search
CPC ............. G06F 3/04847; G06F 3/04883; G06F 3/04886; G06F 3/0485; G06F 3/0488; G06F 3/04812; G06F 3/038; G06F 2203/04801
See application file for complete search history.

(56) References Cited

U.S. PATENT DOCUMENTS 6,512,507 B1 1/2003 Furihata et al.
8,610,933 B2 12/2013 Tani et al.
(Continued)

FOREIGN PATENT DOCUMENTS

JP H08-76927 A 3/1996
JP H11-345087 A 12/1999
(Continued)

OTHER PUBLICATIONS

International Search Report dated Nov. 26, 2013, issued for International Application No. PCT/JP2013-078924.
(Continued)

*Primary Examiner* — Abhishek Sarma
(74) *Attorney, Agent, or Firm* — Procopio Cory Hargreaves and Savitch LLP

(57) ABSTRACT

A determining module configured to determine an operation mode of an electronic device determines the operation mode as a cursor display mode in which a display region displays a cursor when a detecting module detects a first manipulation through a manipulator over the display region. In a case where the operation mode is the cursor display mode, a display module moves the cursor in the display region in response to movement of the manipulator in the display region detected by the detecting module. In a case where the operation mode is the cursor display mode, a processing executing module executes processing related to a display target indicated by the cursor when the detecting module detects that the manipulator moves in the display region so as to indicate the display target by the cursor in the display region and then moves away from the display region.

19 Claims, 18 Drawing Sheets

(56) References Cited

U.S. PATENT DOCUMENTS

| | | | |
|---|---|---|---|
| 2006/0095867 A1* | 5/2006 | Rogalski | G06F 3/0481 715/858 |
| 2007/0262964 A1* | 11/2007 | Zotov | G06F 3/0416 345/173 |
| 2007/0273664 A1* | 11/2007 | Kim | G06F 3/0488 345/173 |
| 2008/0109763 A1* | 5/2008 | Lee | G06F 3/0488 715/856 |
| 2008/0168364 A1* | 7/2008 | Miller | G06F 3/016 715/762 |
| 2009/0228792 A1* | 9/2009 | van Os | G06F 3/0488 715/702 |
| 2010/0050076 A1 | 2/2010 | Roth | |
| 2010/0056221 A1* | 3/2010 | Park | G06F 3/048 455/566 |
| 2010/0169819 A1* | 7/2010 | Bestle | G06F 3/04883 715/773 |
| 2010/0201617 A1* | 8/2010 | Chiu | G06F 3/0481 345/157 |
| 2011/0134126 A1* | 6/2011 | Miyazaki | G06F 3/04883 345/428 |
| 2011/0199639 A1 | 8/2011 | Tani et al. | |
| 2011/0202872 A1 | 8/2011 | Park | |
| 2011/0239153 A1* | 9/2011 | Carter | G06F 3/04883 715/784 |
| 2012/0062599 A1 | 3/2012 | Machida | |
| 2012/0326973 A1 | 12/2012 | Kita | |
| 2013/0278530 A1 | 10/2013 | Hirata | |
| 2014/0208276 A1 | 7/2014 | Park | |
| 2014/0362090 A1* | 12/2014 | Langoulant | G06T 11/20 345/467 |
| 2015/0082163 A1 | 3/2015 | Roth | |

FOREIGN PATENT DOCUMENTS

| | | |
|---|---|---|
| JP | 2002-259359 A | 9/2002 |
| JP | 2003-058316 A | 2/2003 |
| JP | 2009-168574 A | 7/2009 |
| JP | 2009-283013 A | 12/2009 |
| JP | 2011-022851 A | 2/2011 |
| JP | 2011-170574 A | 9/2011 |
| JP | 2012-137837 A | 7/2012 |
| JP | 2012-198939 A | 10/2012 |
| JP | 2012-203433 A | 10/2012 |
| WO | 2010/137121 A1 | 12/2010 |
| WO | 2011-099803 A2 | 8/2011 |
| WO | 2011/108291 A1 | 9/2011 |

OTHER PUBLICATIONS

Written Opinion of the International Searching Authority issued by Japan Patent Office for International Application No. PCT/ JP2013/078924.

Office Action dated Jun. 7, 2016, issued in counterpart Japanese application No. 2012-238144.

Office Action dated Aug. 8, 2017 issued in counterpart Japanese Application No. 2012-238144.

Office Action dated Jan. 10, 2017 issued by the Japan Patent Office in counterpart Japanese Application No. 2012-238144 with concise explanation, 5 pgs.

* cited by examiner

F I G . 4
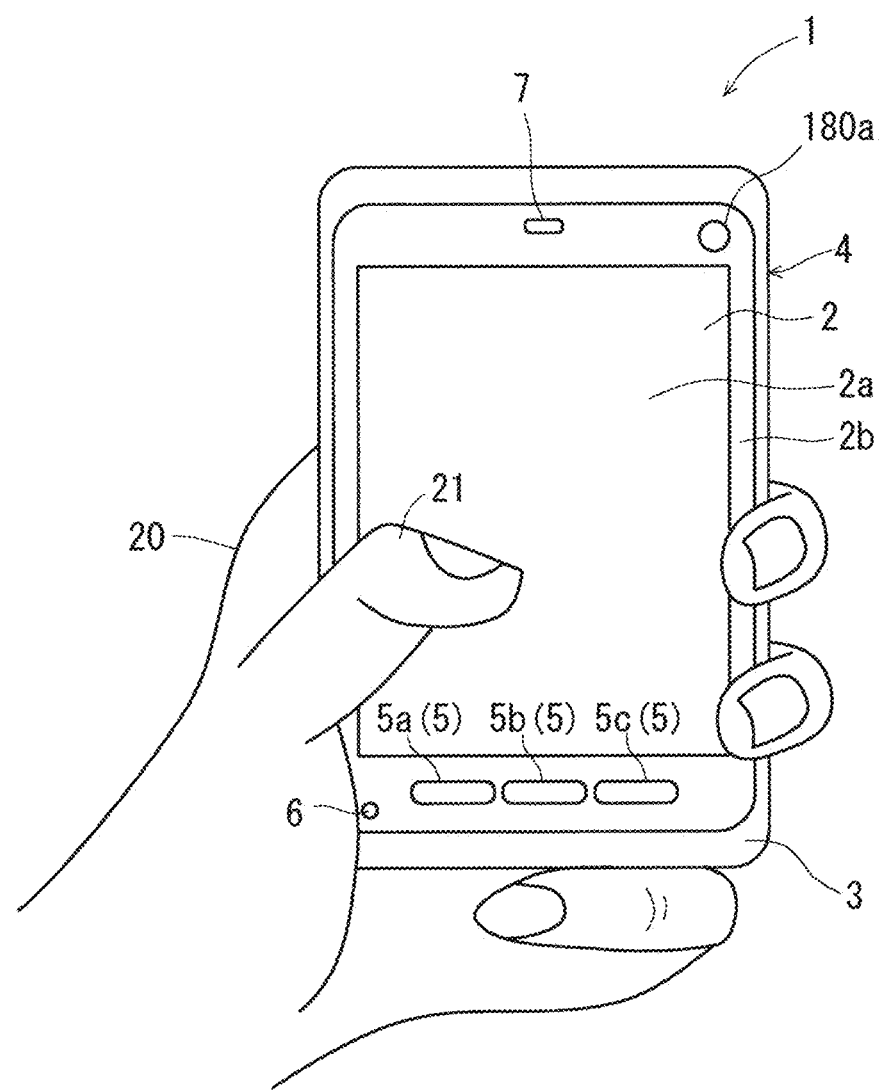

F I G . 5
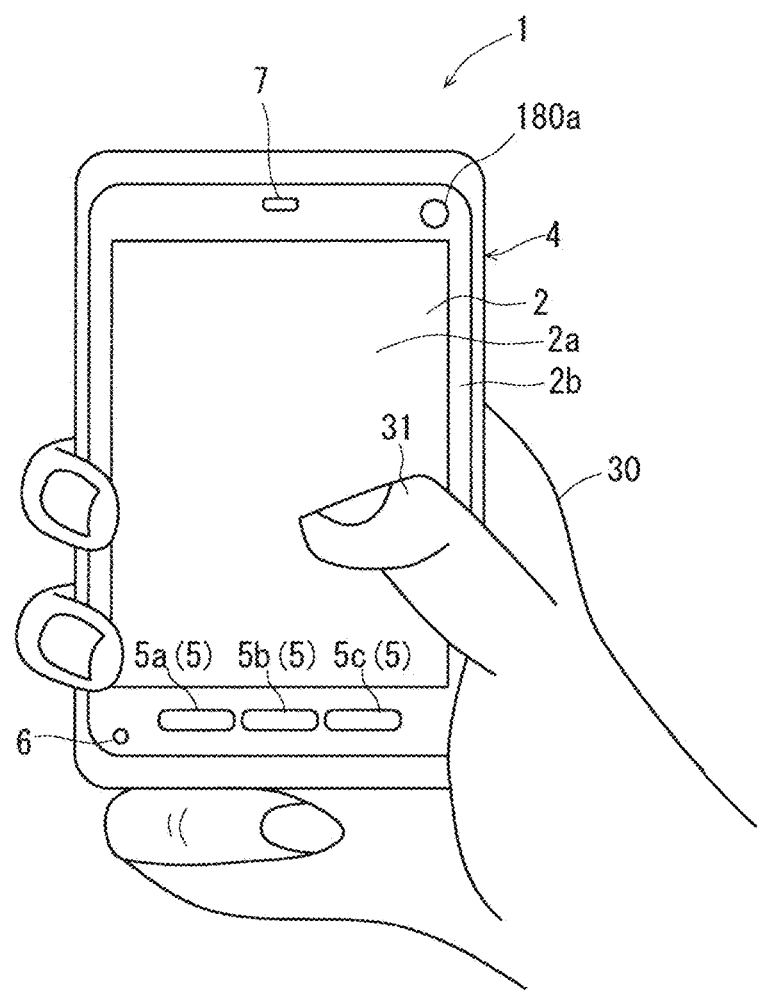

F I G . 2 2
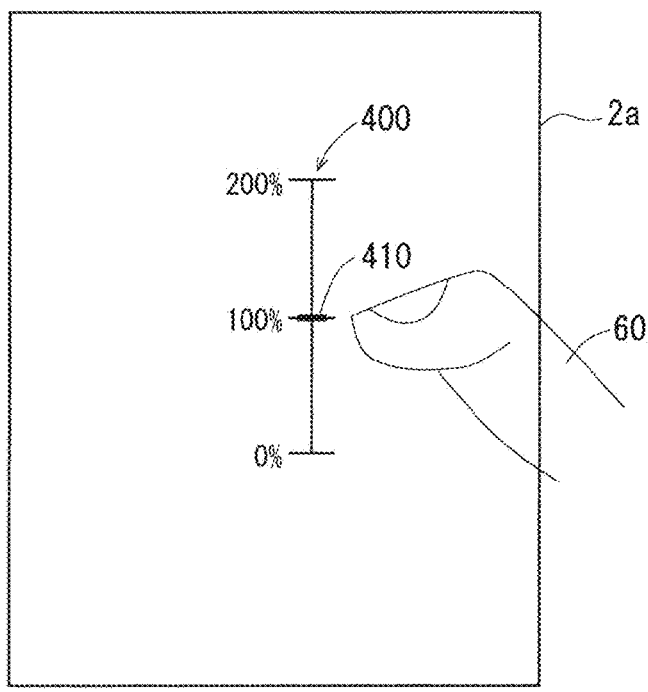
F I G . 2 3
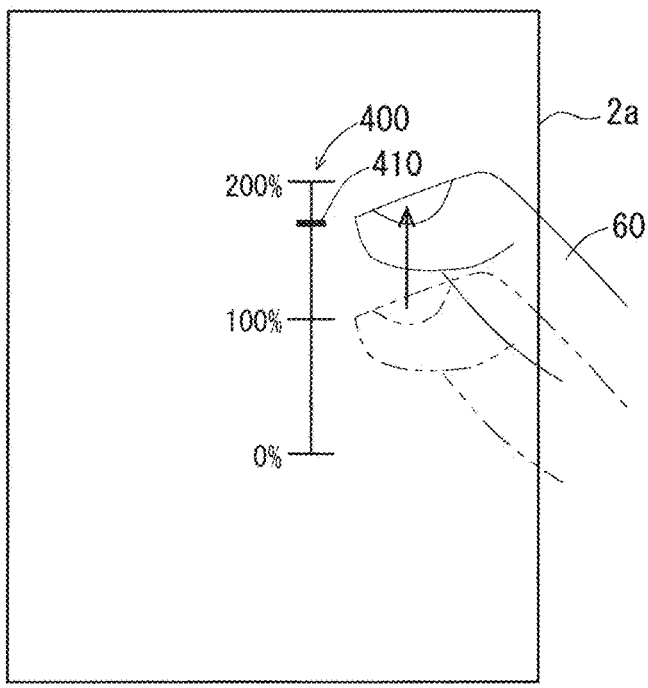

ELECTRONIC DEVICE, STORAGE MEDIUM AND METHOD FOR OPERATING ELECTRONIC DEVICE

CROSS-REFERENCE TO RELATED APPLICATION

The present application is a bypass continuation based on PCT Application No. PCT/JP2013/078924 filed on Oct. 25, 2013, entitled "ELECTRONIC DEVICE AND CONTROL PROGRAM, AS WELL AS METHOD FOR OPERATING ELECTRONIC DEVICE", which claims the benefit of Japanese Application No. 2012-238144, filed on Oct. 29, 2012, entitled "ELECTRONIC DEVICE AND CONTROL PROGRAM, AS WELL AS METHOD FOR OPERATING ELECTRONIC DEVICE". The disclosure of the above applications is each incorporated herein by reference.

FIELD

Embodiments of the present disclosure relates to an electronic device.

BACKGROUND

Conventionally, various techniques are proposed in relation to an electronic device.

SUMMARY

A electronic device, a storage medium and method for operating electronic device are disclosed. In one embodiment, an electronic device comprises a determining module configured to determine an operation mode of the electronic device, a display module configured to perform display in a display region, a detecting module configured to detect a manipulation through a manipulator over the display region, and a processing executing module configured to execute processing related to a display target displayed on the display region. The determining module determines the operation mode as a cursor display mode in which the display region displays a cursor when the detecting module detects a first manipulation through the manipulator over the display region. In a case where the operation mode is the cursor display mode, the display module moves the cursor in the display region in response to movement of the manipulator in the display region detected by the detecting module. In a case where the operation mode is the cursor display mode, the processing executing module executes processing related to a display target indicated by the cursor when the detecting module detects that the manipulator moves in the display region so as to indicate the display target by the cursor in the display region and then moves away from the display region.

In one embodiment, a non-temporary storage medium readable by a computer stores a control program that controls an electronic device comprising a display region. The storage medium storing the control program is configured to cause the electronic device to execute the steps of (a) determining an operation mode of the electronic device as a cursor display mode in which the display region displays a cursor when detecting a first manipulation by a manipulator for the display region, (b) in a case where the operation mode is the cursor display mode, moving the cursor in the display region in response to movement of the manipulator in the display region detected by the detecting module, and (c) in a case where the operation mode is the cursor display mode, executing processing related to a display target indicated by the cursor when detecting that the manipulator moves in the display region so as to indicate the display target by the cursor in the display region and then moves away from the display region.

In one embodiment, a method for operating an electronic device comprises a display region. The method comprises the steps of (a) determining an operation mode of the electronic device as a cursor display mode in which the display region displays a cursor when a first manipulation by a manipulator for the display region is detected, (b) in a case where the operation mode is the cursor display mode, moving the cursor in the display region in response to movement of the manipulator in the display region detected by the detecting module, and (c) in a case where the operation mode is the cursor display mode, executing processing related to a display target indicated by the cursor when detecting that the manipulator moves in the display region so as to indicate the display target by the cursor in the display region and then moves away from the display region.

BRIEF DESCRIPTION OF DRAWINGS

FIG. 4 illustrates a view of a situation in which a user holds the electronic device by a left hand.

FIG. 5 illustrates a view of a situation in which the user holds the electronic device by a right hand.

FIG. 22 illustrates a view of an example of the display of the electronic device.

FIG. 23 illustrates a view of an example of the manipulation through the manipulator for the display region of the electronic device.

DESCRIPTION OF EMBODIMENT

<External Appearance of Electronic Device>

Figure 1:
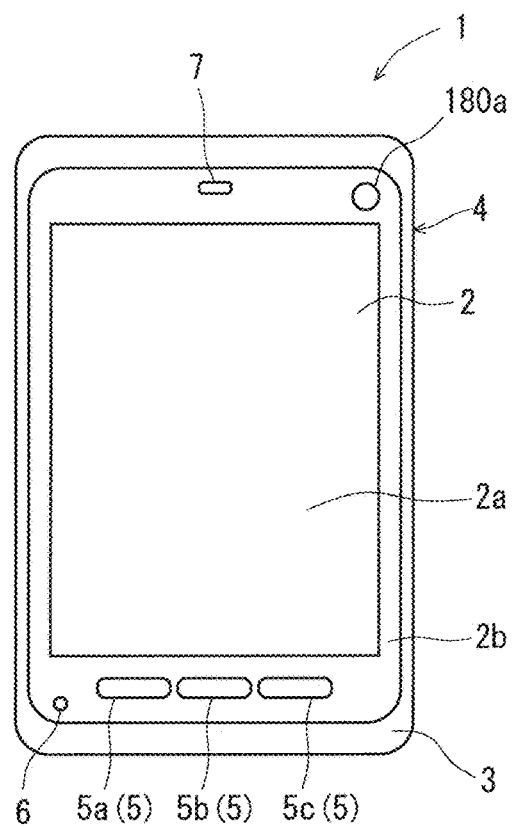
FIG. 1 illustrates a front view of an external appearance of an electronic device.
Figure 2:
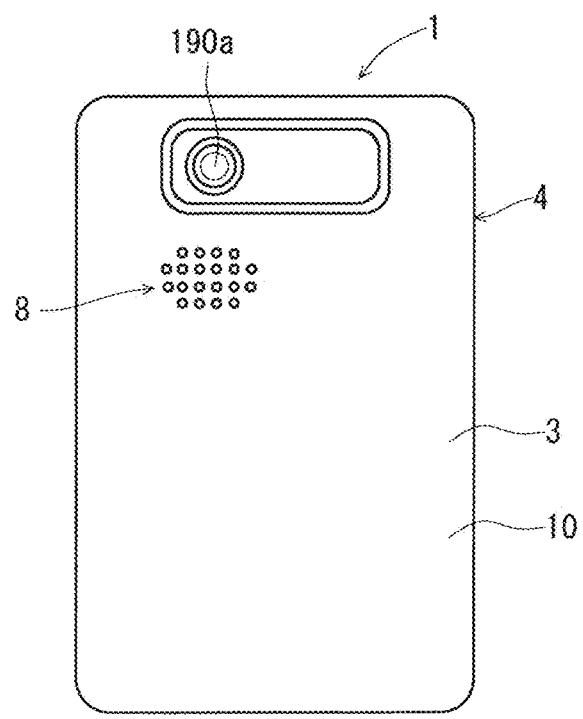
FIG. 2 illustrates a back view of the external appearance of the electronic device.

FIGS. 1 and 2 illustrate front and back views of an external appearance of an electronic device 1 according to an embodiment, respectively. The electronic device 1 according to one embodiment is a portable telephone, for example. The electronic device 1 can communicate with other communication devices via a base station, a server and the like. As shown in FIGS. 1 and 2, the electronic device 1 includes a cover panel 2 and a case portion 3. The cover panel 2 and the case portion 3 are combined to configure a device case 4 taking a shape of an almost rectangular plate in planar view.

The cover panel 2 takes an almost rectangular shape in planar view. The cover panel 2 forms a portion other than a peripheral edge part in a front portion of the electronic device 1. The cover panel 2 is formed of a transparent glass or a transparent acrylic resin, for example. The case portion 3 forms a peripheral edge part of the front portion, a side portion and a back portion in the electronic device 1. The case portion 3 is formed of a polycarbonate resin, for example.

A front face of the cover panel 2 is provided with a display region 2a for displaying various information such as a character, a mark or a graphic. The display region 2a takes a rectangular shape in planar view, for example. A peripheral edge portion 2b surrounding the display region 2a in the cover panel 2 is made black by pasting a film or the like, for example. Consequently, the peripheral edge portion 2b is a non-display portion where information is not displayed. A touch panel 130 which will be described later is pasted to a back face of the cover panel 2. A user can give various instructions to the electronic device 1 by manipulating the display region 2a on the front face of the electronic device 1 with a finger or the like. The user can give various instructions to the electronic device 1 by manipulating the display region 2a with a manipulator other than a finger, for example, a pen for an electrostatic touch panel such as a stylus pen.

A home key 5a, a menu key 5b and a back key 5c are provided in the device case 4. Each of the home key 5a, the menu key 5b and the back key 5c is a hardware key. A surface of each of the home key 5a, the menu key 5b and the back key 5c is exposed at a lower side end of the front face of the cover panel 2. The home key 5a is a manipulation key for displaying a home screen (an initial screen) on the display region 2a. The menu key 5b is a manipulation key for displaying an option menu screen. The back key 5c is a manipulation key for returning the display of the display region 2a to last display. In the case in which the home key 5a, the menu key 5b and the back key 5c do not need to be particularly distinguished from each other, they will be hereinafter referred to as a "manipulation key 5". The home key 5a, the menu key 5b and the back key 5c do not need to be the hardware keys but may be software keys which are displayed on the display region 2a and for which manipulations are detected by the touch panel 130.

A microphone hole 6 is formed on a lower side end of the cover panel 2. A receiver hole 7 is formed on an upper side end of the cover panel 2. An imaging lens 180a provided in a front side imaging module 180 which will be described later can be visually recognized at an upper side end of a front face of the cover panel 2. As shown in FIG. 2, moreover, a speaker hole 8 is formed on a back face of the electronic device 1, that is to say, a back face of the device case 4. An imaging lens 190a provided in a back side imaging module 190 which will be described later can be visually recognized on the back face of the electronic device 1.

<Electrical Structure of Electronic Device>

Figure 3:
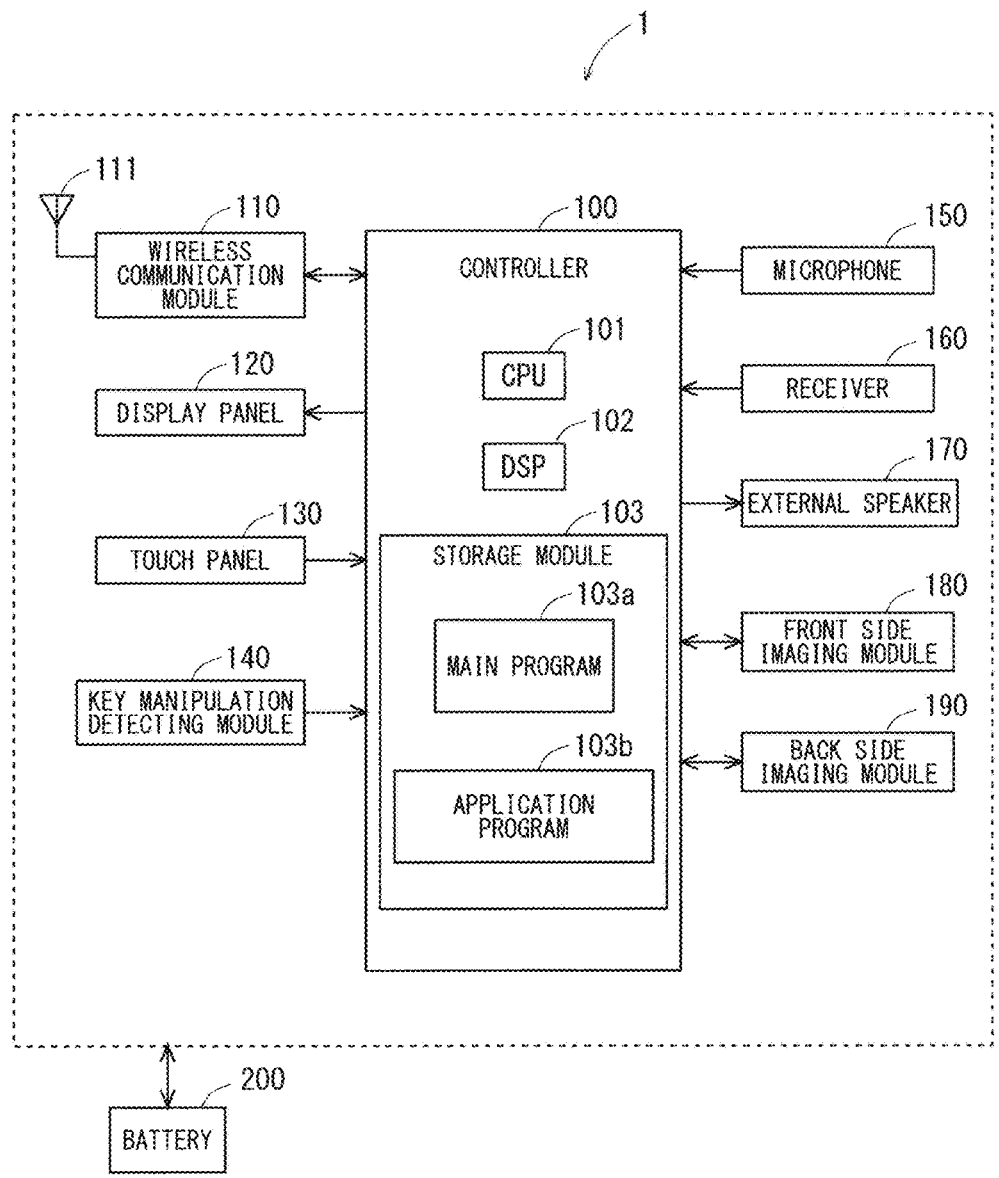
FIG. 3 illustrates a block diagram of an electrical structure of the electronic device.

FIG. 3 illustrates a block diagram of an electrical structure of the electronic device 1. As shown in FIG. 3, the electronic device 1 is provided with a controller 100, a wireless communication module 110, a display panel 120, the touch panel 130 and a key manipulation detecting module 140. Furthermore, the electronic device 1 is provided with a microphone 150, a receiver 160, an external speaker 170, a front side imaging module 180, a back side imaging module 190 and a battery 200. These components provided on the electronic device 1 are housed in the device case 4.

The controller 100 includes a CPU (Central Processing Unit) 101, a DSP (Digital Signal Processor) 102, a storage module 103 and the like. The controller 100 controls the other components of the electronic device 1, thereby managing the operation of the electronic device 1 totally. The storage module 103 is configured from non-temporary recording media which can be read by the electronic device 1 (the CPU 101 and the DSP 102)), for example, an ROM (Read Only Memory) and an RAM (Random Access Memory). The storage module 103 may include non-transitory computer-readable recording medium other than the ROM and the RAM. The storage module 103 may include a hard disk drive, an SSD (Solid State Drive), a USB (Universal Serial Bus) memory and the like, for example.

The storage module 103 stores a main program 103a which is control program for controlling an operation of the electronic device 1, more specifically, respective components of the wireless communication module 110, the display panel 120 and the like which are provided in the electronic device 1, a plurality of application programs 103b and the like. Various functions of the controller 100 are implemented by executing various programs in the storage module 103 through the CPU 101 and the DSP 102. In FIG. 3, only one application program 103b is shown in order to avoid complicatedness of the figure.

The wireless communication module 110 has an antenna 111. The wireless communication module 110 can receive a signal from a communication device such as a portable telephone separate from the electronic device 1 or a web server connected to internet through a base station or the like by the antenna 111. The wireless communication module 110 performs amplification processing and down-conversion over the received signal and outputs a signal thus obtained to the controller 100. The controller 100 performs demodulation processing or the like over the input received signal, thereby acquiring a sound signal indicative of a voice, a music or the like which is included in the received signal, etc. Moreover, the wireless communication module 110 performs up-conversion and amplification processing over a transmitted signal including a sound signal or the like which is generated by the controller 100, thereby sending the transmitted signal subjected to the processing from the antenna 111 by wireless. The signal transmitted from the antenna 111 is received via the base station or the like by a portable telephone separate from the electronic device 1 or a communication device connected to internet via the base station or the like.

The display panel 120 is a liquid crystal display panel or an organic EL panel, for example. The display panel 120 is controlled by the controller 100, thereby displaying various information such as a character, a mark or a graphic. Information displayed on the display panel 120 is displayed on the display region 2a at the front face of the cover panel 2. Accordingly, it is apparent that the display panel 120 performs the display in the display region 2a.

The touch panel 130 can detect a manipulation by a manipulator such as a finger over the display region 2a of the cover panel 2. The touch panel 130 is a projected capacitive touch panel, for example, and is stuck onto the back face of the cover panel 2. When a user manipulates the display region 2a of the cover panel 2 by the manipulator such as the finger, a signal corresponding thereto is input through the touch panel 130 to the controller 100. The controller 100 can specify the content of the manipulation performed over the display region 2a based on a signal transmitted from the touch panel 130, thereby executing processing corresponding to the content.

In the touch panel 130 according to one embodiment, a detection sensitivity is set to be high. For this reason, it is possible to detect that the manipulator touches the display region 2a, and furthermore, that the manipulator approaches the display region 2a at a distance from the display region 2a which is equal to or smaller than a predetermined distance. In other words, the detection sensitivity of the touch panel 130 is set in such a manner that the touch panel 130 reacts when the distance between the display region 2a and the manipulator is equal to or smaller than the predetermined distance. Accordingly, the touch panel 130 can detect that the manipulator touching the display region 2a moves away from the display region 2a, and furthermore, the manipulator approaching the display region 2a at the distance from the display region 2a which is equal to or smaller than the predetermined distance moves away from the display region 2a in such a manner that the distance from the display region 2a is greater than the predetermined distance.

Hereinafter, the manipulator approaching the display region 2a implies that the manipulator approaches the display region 2a at the distance from the display region 2a which is equal to or smaller than the predetermined distance, that is, the manipulator approaches the display region 2a until the touch panel 130 reacts. In one embodiment, moreover, the manipulator moving away from the display region 2a includes that the manipulator touching the display region 2a moves away from the display region 2a, and furthermore, the manipulator approaching the display region 2a at the distance from the display region 2a which is equal to or smaller than the predetermined distance moves away from the display region 2a in such a manner that the distance from the display region 2a is greater than the predetermined distance.

The key manipulation detecting module 140 can detect the press-down manipulation by the user against each manipulation key 5. The key manipulation detecting module 140 can detect whether the manipulation key 5 is pressed down (manipulated) or not. In the case in which the manipulation key 5 is not pressed down, the key manipulation detecting module 140 outputs, to the controller 100, a non-manipulation signal indicating that the manipulation key 5 is not manipulated. When the manipulation key 5 is pressed down, moreover, the key manipulation detecting module 140 outputs, to the controller 100, a manipulation signal indicating that the manipulation key 5 is manipulated. Consequently, the controller 100 can decide whether the manipulation key 5 is manipulated or not.

When the key manipulation detecting module 140 detects that the home key 5a is pressed down and is then released, the controller 100 causes the display panel 120 to display a home screen (an initial screen). Consequently, the home screen is displayed on the display region 2a. When the key manipulation detecting module 140 detects that the menu key 5b is pressed down and is then released, moreover, the controller 100 causes the display panel 120 to display an option menu screen. Consequently, the option menu screen is displayed on the display region 2a. When the key manipulation detecting module 140 detects that the back key 5c is pressed down and is then released, thereafter, the controller 100 causes the display panel 120 to return the display to a last one. Thus, the display of the display region 2a is returned to the last one.

The microphone 150 can convert a sound input from an outside of the electronic device 1 into an electrical sound signal and output the sound signal to the controller 100. The sound input from the outside of the electronic device 1 is taken into the electronic device 1 through the microphone hole 6 provided on the front face of the cover panel 2 and is thus input to the microphone 150.

The external speaker 170 is a dynamic speaker, for example. The external speaker 170 can convert the electrical sound signal input from the controller 100 into a sound and output the sound. The sound output through the external speaker 170 is output to the outside through the speaker hole 8 provided on the back face of the electronic device 1. The sound output through the speaker hole 8 can be heard in a place apart from the electronic device 1.

The front side imaging module 180 is configured from an imaging lens 180*a*, an imaging element and the like. The front side imaging module 180 captures a static image and a moving image based on the control of the controller 100. As shown in FIG. 1, the imaging lens 180*a* is provided on the front face of the electronic device 1. Therefore, the front side imaging module 180 can image an object present on the front face side of the electronic device 1 (the cover panel 2 side).

The back side imaging module 190 is configured from an imaging lens 190*a*, an imaging element and the like. The back side imaging module 190 captures a static image and a moving image based on the control of the controller 100. As shown in FIG. 2, the imaging lens 190*a* is provided on the back face of the electronic device 1. Therefore, the back side imaging module 190 can image an object present on the back face 10 side of the electronic device 1.

The receiver 160 can output a received voice. The receiver 160 is configured from a dynamic speaker, for example. The receiver 160 can convert an electrical sound signal output from the controller 100 into a sound and output the sound. The sound output through the receiver 160 is output to the outside through the receiver hole 7 provided on the front face of the electronic device 1. The volume of the sound output through the receiver hole 7 is lower than the volume of the sound output through the speaker hole 8.

The battery 200 can output a power to the electronic device 1. The power output from the battery 200 is supplied to respective electronic components included in the controller 100, the wireless communication module 110 and the like which are provided in the electronic device 1.

The storage module 103 stores various application programs 103*b* (hereinafter referred to as "applications 103*b*"). The storage module 103 stores a telephone application for making a telephone call by using a telephone function, a browser for displaying a website, and a mail application for creating, reading and transmitting/receiving an electronic mail, for example. Moreover, the storage module 103 stores a television application for viewing and recording a television program, a moving image playback control application for controlling playback of moving image data stored in the storage module 103, a music playback control application for controlling playback of music data stored in the storage module 103, and the like.

When the controller 100 executing the main program 103*a* in the storage module 103 reads and executes the application 103*b* in the storage module 103, the controller 100 controls other components in the electronic device 1, for example, the wireless communication module 110, the display panel 120, the receiver 160 and the like so that a function (processing) corresponding to the application 103*b* is executed by the electronic device 1. For example, the controller 100 executing the telephone application controls the wireless communication module 110, the microphone 150 and the receiver 160. In the electronic device 1, consequently, a voice included in a signal received by the wireless communication module 110 is output through the receiver 160, and furthermore, a transmitted signal including the voice input to the microphone 150 is transmitted from the wireless communication module 110 so that a telephone communication using a telephone function is made together with a communication partner device.

<Referring to Type of Manipulation for Display Region>

A basic manipulation to be performed for the display region 2*a* by the user includes a slide manipulation, a tap manipulation, a flick manipulation and the like, for example.

The slide manipulation is a manipulation of moving the manipulator such as the finger in a state in which it touches or approaches the display region 2*a*. In other words, the side manipulation is a manipulation of moving the manipulator in the display region 2*a*. The user performs the slide manipulation over the display region 2*a*, thereby enabling the display of the display region 2*a* to be scrolled or switching a page displayed on the display region 2*a* into another page, for example.

In one embodiment, thus, the manipulation of moving the manipulator in the display region 2*a* includes both a manipulation of moving the manipulator in a state in which it touches the display region 2*a* and a manipulation of moving the manipulator in a state in which it approaches the display region 2*a*.

The tap manipulation is a manipulation of causing the manipulator to separate from the display region 2*a* immediately after the manipulator touches or approaches the display region 2*a*. In detail, the tap manipulation is a manipulation of causing the manipulator to separate from the display region 2*a* in a touch position or an approximate position within a predetermined time after it touches or approaches the display region 2*a*. The user can select an application icon (hereinafter referred to as an "application icon") for executing the application 103*b* displayed on the display region 2*a* to cause the electronic device 1 to execute the application 103*b* by performing the tap manipulation over the display region 2*a*, for example.

The flick manipulation is a manipulation of flicking the display region 2*a* by means of the manipulator. In detail, the flick manipulation is a manipulation of moving the manipulator by a predetermined distance or more within a predetermined time in the state in which it touches or approaches the display region 2*a* and then moving the manipulator away from the display region 2*a*. The user performs the flick manipulation over the display region 2*a*, thereby enabling the display of the display region 2*a* to be scrolled in a direction of the flick manipulation or switching a page displayed on the display region 2*a* into another page, for example.

<Referring to Electronic Device Manipulating Method of User>

FIGS. 4 and 5 illustrate views showing an example of a situation in which the user manipulates the electronic device 1. FIG. 4 shows a situation in which the user holds the electronic device 1 by a left hand 20, thereby manipulating the display region 2*a* with a thumb 21 of the left hand 20. FIG. 5 shows a situation in which the user holds the electronic device 1 by a right hand 30 to manipulate the display region 2*a* with a thumb 31 of the right hand 30.

In some cases in which the user holds the electronic device 1 by a single hand to manipulate the display region 2*a* with a thumb as shown in FIGS. 4 and 5, the user may manipulate the end of the display region 2*a* with difficulty. More specifically, in some cases the user selects, with the thumb, a display target such as an application icon or a link in a web page (referred to as a "hyperlink") which is displayed on the end of the display region 2*a* with difficulty. With progress of enlargement in a screen due to increase in the display region 2*a*, this problem is remarkable.

Therefore, the electronic device 1 according to one embodiment can display, on the display region 2*a*, the same cursor (pointer) as a mouse cursor (referred to as a "mouse pointer") to be used in a personal computer or the like. The user can manipulate the display region 2*a*, thereby moving the cursor in the display region 2*a*. Also in the case in which the user manipulates the electronic device 1 by a single hand as shown in FIGS. 4 and 5, consequently, he/she can manipulate the electronic device 1 easily. This respect will be described below in detail.

<Referring to Operation Mode of Electronic Device>

The electronic device 1 according to one embodiment includes a cursor display mode, an enlargement/reduction mode and a selection mode as an operation mode. The cursor display mode is a mode for displaying a cursor on the display region 2a. The enlargement/reduction mode is a mode for enlarging and reducing the display of the display region 2a. The selection mode is a mode for selecting a mode to be the operation mode of the electronic device 1 from the cursor display mode and the enlargement/reduction mode. A state in which the electronic device 1 does not operate in the cursor display mode, the enlargement/reduction mode and the selection mode will be hereinafter referred to as a "normal mode".

The controller 100 functions as an operation mode determining module for determining the operation mode of the electronic device 1. In the case in which the operation mode is the normal mode, the controller 100 sets the operation mode to the selection mode when a predetermined manipulation is performed over the display region 2a. In the case in which the operation mode is the selection mode, the electronic device 1 sets the operation mode to the cursor display mode or the enlargement/reduction mode in response to a manipulation for the display region 2a.

Each operation mode of the electronic device 1 will be described below by taking, as an example, the case in which a web page is displayed on the display region 2a. Also in the case in which contents other than the web page are displayed on the display region 2g, the following description applies. As an example, it is assumed that the user holds the electronic device 1 by the right hand 30 to manipulate the display region 2a with the thumb 31 of the right hand 30 as shown in FIG. 5. The drawings which will be described later show the thumb of the right hand of the user as an manipulator 60 for manipulating the display region 2a. Even if the manipulator 60 is another thing, the following description applies.

<Referring to Normal Mode>

Figure 6:
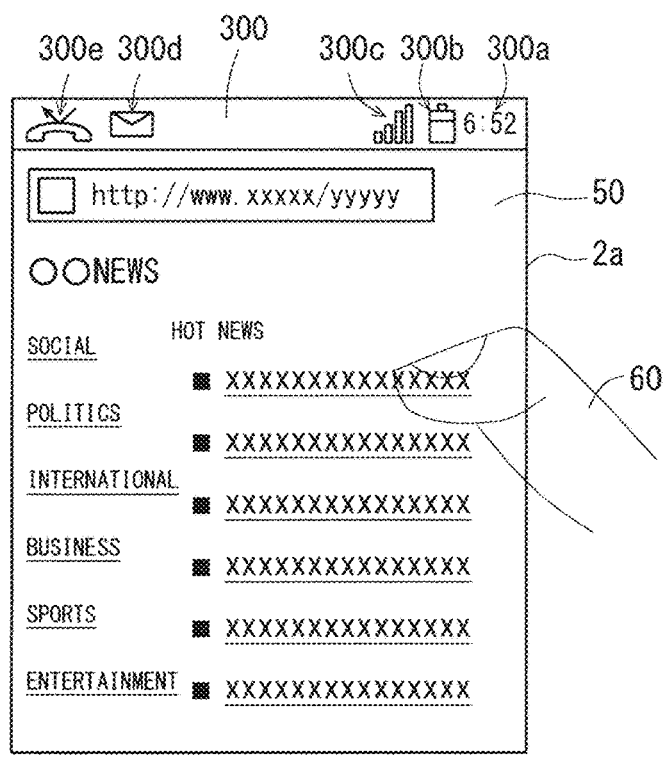
FIG. 6 illustrates a view of an example of display of the electronic device.

FIG. 6 illustrates a view of an example of a situation in which the web page is displayed on the display region 2a. In the example of FIG. 6, a web page 50 indicative of news information is displayed on the display region 2a. The web page 50 includes a plurality of links (hyperlinks). In FIG. 6, the link in the web page 50 is underlined. The controller 100 for executing the browser in the storage module 103 acquires the web page 50 from a web server via the wireless communication module 110. The controller 100 controls the display panel 120 so that the web page 50 is displayed on the display region 2a.

Moreover, information indicative of the state of the electronic device 1 is displayed on the display region 2a in addition to the web page 50. In the example of FIG. 6, a current time 300a measured by the electronic device 1, an icon (graphic) 300b for giving a notice of a residual amount of the battery, and an icon 300c for giving a notice of a communication state are displayed as information indicative of the state of the electronic device 1 on an upper end 300 of the display region 2a.

When a specific event is generated in the electronic device 1, furthermore, information about the event is displayed on the upper end 300 of the display region 2a. When detecting that a specific event is generated in the electronic device 1, the controller 100 controls the display panel 120 to display the information about the event on the display region 2a. In the example of FIG. 6, an icon 300d and an icon 300e are displayed as information about the event generated in the electronic device 1 on the upper end 300 of the display region 2a. The icon 300d serves to give a notice of the generation of an event to be receipt of a new electronic mail and the icon 300e serves to give a notice of the generation of an event to be a missed call.

In one embodiment, in the case in which the display of the display region 2a is ON, information indicative of the state of the electronic device 1 is always displayed on the upper end 300 of the display region 2a except for a state in which a specific application 103b is executed. When the information indicative of the state of the electronic device 1 is displayed on the upper end 300 of the display region 2a, information about a specific event is also displayed on the upper end 300 if the event is generated in the electronic device 1. In the display region 2a, the upper end 300 displaying the information indicative of the state of the electronic device 1 or the like will be hereinafter referred to as a "notice region 300". The notice region 300 is referred to as a "pict area".

In the case in which the operation mode of the electronic device 1 is the normal mode, the controller 100 decides that a link included in the web page 50 is selected by the user when the touch panel 130 detects that the manipulator 60 performs the tap manipulation over a portion in the display region 2a where the link is displayed. Then, the controller 100 communicates with the pertinent web server via the wireless communication module 110, thereby acquiring a web page indicated by the link from the web server. The display panel 120 displays the web page acquired by the controller 100 on the display region 2a under the control of the controller 100.

Thus, the controller 100 and the display panel 120 function as processing executing modules for executing processing related to the link to be one of display targets displayed on the display region 2a. The processing for acquiring and displaying the web page indicated by the link is related to the link.

In the case in which the operation mode of the electronic device 1 is the normal mode, moreover, the display panel 120 enlarges the display of the display region 2a by setting, as a base point (the center), a portion subjected to the tap manipulation in the display region 2a by the control of the controller 100 when the touch panel 130 detects that the tap manipulation is continuously performed twice within a predetermined time by the manipulator 60 over a portion other than the notice region 300 and other than the portion where the link is displayed in the display region 2a. The two-time continuous tap manipulation is referred to as a "double tap manipulation". When the touch panel 130 detects that the double tap manipulation is performed by the manipulator 60 over the portion other than the notice region 300 and other than the portion where the link is displayed in the display region 2a, subsequently, the display panel 120 reduces the display of the display region 2a, thereby returning the enlarged display of the display region 2a into original display.

In the case in which the operation mode of the electronic device 1 is the normal mode, moreover, the display panel 120 scrolls the display of the web page 50 in the display region 2a by the control of the controller 100 when the touch panel 130 detects that the slide manipulation in a vertical direction is performed by the manipulator 60 over the portion other than the notice region 300 in the display region 2a.

In the case in which the operation mode of the electronic device 1 is the normal mode, furthermore, the display panel 120 scrolls the display of the web page 50 in the display region 2a by the control of the controller 100 when the touch panel 130 detects that the flick manipulation in a vertical direction is performed by the manipulator 60 over the portion other than the notice region 300 in the display region 2a.

Figure 7:
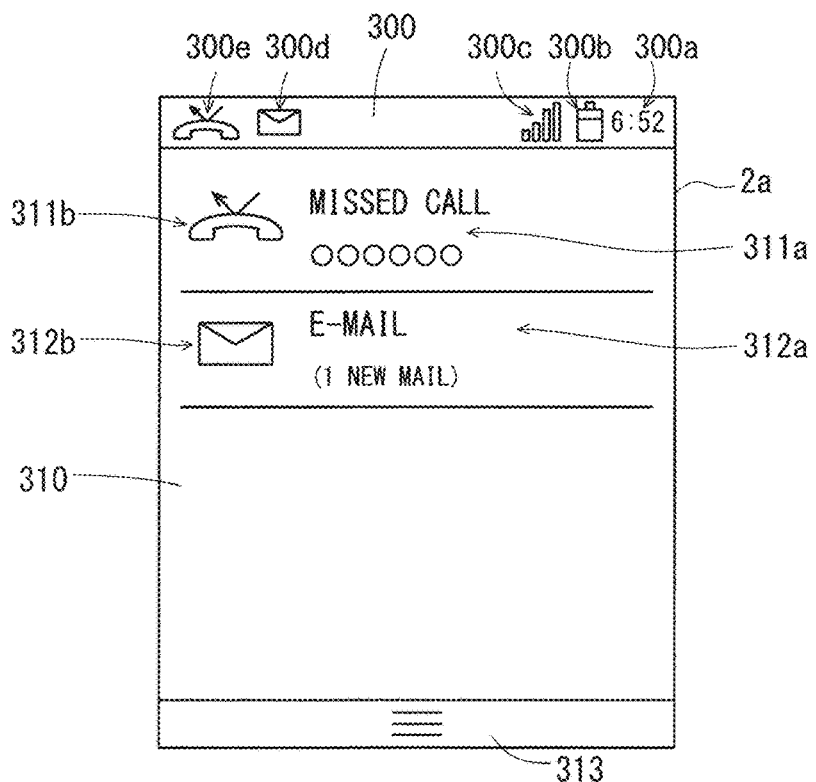
FIG. 7 illustrates a view of an example of the display of the electronic device.

In the case in which the operation mode of the electronic device 1 is the normal mode, moreover, the display panel 120 displays, on the display region 2a, a notice image 310 including information about the event generated in the electronic device 1 by the control of the controller 100 when the touch panel 130 detects such a manipulation as to pull down the notice region 300 of the display region 2a by the manipulator 60, that is, the slide manipulation in a downward direction by the manipulator 60 over the display region 2a with the notice region 300 taken as a starting point. FIG. 7 illustrates a view of an example of the notice image 310. The notice image 310 is displayed to be extended gradually in the downward direction (pull-down display) in response to the slide manipulation in the downward direction over the display region 2a.

As shown in FIG. 7, the notice image 310 is displayed in a region other than the notice region 300 in the display region 2a. In the example of FIG. 7, the notice image 310 includes a character string 311a and an icon 311b for giving a notice of the generation of the missed call corresponding to the icon 300e displayed on the notice region 300. Moreover, the notice image 310 includes a character string 312a and an icon 312b for giving a notice of generation of receipt of a new electronic mail corresponding to the icon 300d displayed on the notice region 300.

Moreover, the notice image 310 includes a non-display manipulation starting point region 313 serving as a starting point of a manipulation for non-display of the notice image 310. When the touch panel 130 detects the slide manipulation in an upward direction through the manipulator 60 over the display region 2a with the non-display manipulation starting point region 313 as a starting point, the display panel 120 erases the display of the notice image 310 in the display region 2a.

<Referring to Selection Mode>

Figure 8:
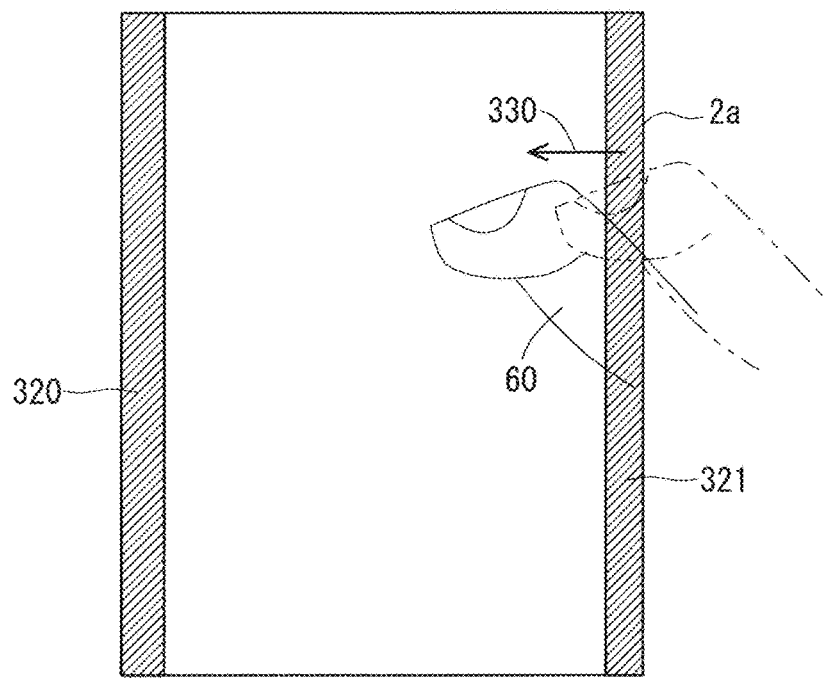
FIG. 8 illustrates a view of an example of a manipulation through a manipulator for a display region of the electronic device.

In one embodiment, as shown in FIG. 8, a left end 320 and a right end 321 in the display region 2a serve as starting points of a manipulation for setting the operation mode of the electronic device 1 to the selection mode, respectively. In the specification, the "left" implies a left side seen toward the display region 2a and the "right" implies a right side seen toward the display region 2a.

In the case in which the operation mode of the electronic device 1 is the normal mode, the controller 100 sets the operation mode of the electronic device 1 to the selection mode when the touch panel 130 detects that the manipulator 60 moves from the right end 321 of the display region 2a in a selection mode setting direction 330 by a predetermined distance (for example, 1 cm) or more as shown in FIG. 8. In other words, in the case in which the operation mode of the electronic device 1 is the normal mode, the controller 100 sets the operation mode of the electronic device 1 to the selection mode when the touch panel 130 detects that the slide manipulation is performed over the display region 2a through the manipulator 60 by a predetermined distance or more in the selection mode setting direction 330 from the right end 321 as the starting point. In FIG. 8, the manipulator 60 which has not been moved is shown in a dashed line. The same applies to the following drawings.

The selection mode setting direction 330 is an inward direction from the right end 321 if the movement of the manipulator 60 starts at the right end 321 of the display region 2a as in the present example. More specifically, in the case in which the movement of the manipulator 60 starts at the right end 321 of the display region 2a, the selection mode setting direction 330 is set to be a transverse direction (a direction perpendicular to a vertical direction) inward from the right end 321 of the display region 2a.

On the other hand, in the case in which the movement of the manipulator 60 starts at the left end 320 of the display region 2a, for example, the user holds the electronic device 1 by the left hand to manipulate the display region 2a with the thumb of the left hand, the selection mode setting direction 330 is set to be the transverse direction inward from the left end 320 of the display region 2a. In the case in which the operation mode of the electronic device 1 is the normal mode, accordingly, the operation mode of the electronic device 1 is set to be the selection mode when the user holds the electronic device 1 by the left hand and moves the thumb of the left hand inward from the left end 320 of the display region 2a in the transverse direction. The controller 100 stores operation mode information indicative of a current operation mode. The controller 100 updates the operation mode information in response to a change in the operation mode of the electronic device 1 if any.

Hereinafter, a manipulation which is performed over the display region 2a by the manipulator 60 and serves to set the operation mode of the electronic device 1 to the selection mode will be referred to as a "selection mode setting manipulation". In one embodiment, the selection mode setting manipulation is a manipulation of moving the manipulator 60 from the right end 321 or the left end 320 of the display region 2a in the selection mode setting direction 330 by a predetermined distance or more as described above.

Figure 9:
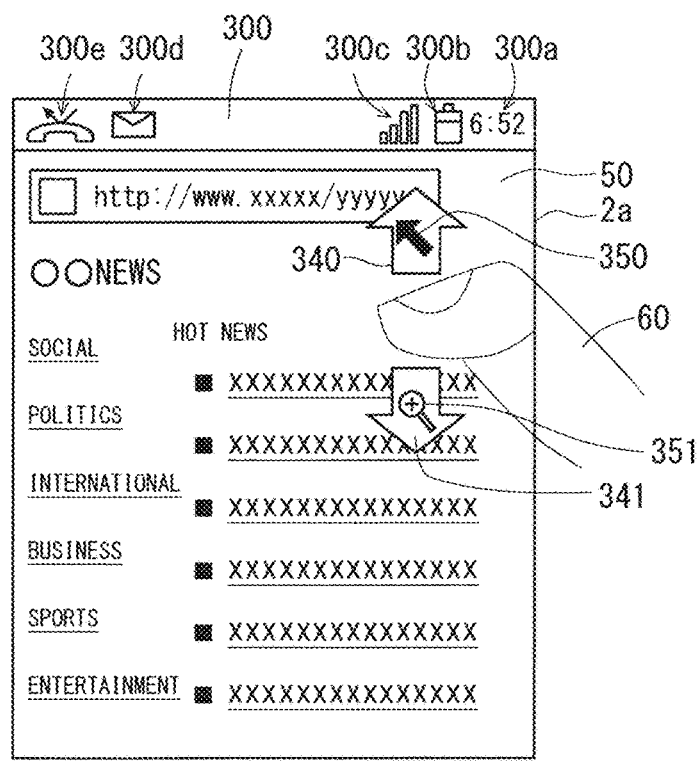
FIG. 9 illustrates a view of an example of the display of the electronic device.

FIG. 9 illustrates a view of the display of the display region 2a in the case in which the operation mode of the electronic device 1 is set to be the selection mode. When the selection mode setting manipulation is performed over the display region 2a so that the operation mode of the electronic device 1 is set to be the selection mode, a first arrow 340 in an upward direction and a second arrow 341 in a downward direction are displayed so as not to overlap with the manipulator 60 at upper and lower sides, respectively, in a portion of the display region 2a that the manipulator 60 touches or approaches as shown in FIG. 9. Moreover, a cursor 350 is displayed in overlap with the first arrow 340 so as not to overlap with the manipulator 60 in the display region 2a. A magnifying glass graphic 351 indicative of a magnifying glass is displayed in overlap with the second arrow 341 so as not to overlap with the manipulator 60 in the display region 2a. The display panel 120 displays the first arrow 340, the second arrow 341, the cursor 350 and the magnifying glass graphic 351 except for the portion of the display region 2a that the manipulator 60 touches or approaches so that they are displayed on the display region 2a so as not to overlap with the manipulator 60.

When the display of the cursor 350 on the display region 2a starts, thus, the cursor 350 is displayed on the display region 2a so as not to overlap with the manipulator 60 touching or approaching the display region 2a. Accordingly, the possibility of the position of the cursor 350 not being found by the cursor 350 being hidden by the manipulator 60 can be reduced.

When the touch panel 130 detects that the manipulator 60 touching or approaching the display region 2a moves away from the display region 2a after the selection mode setting manipulation is performed over the display region 2a, that is, after the manipulator 60 moves from the right end 321 or the left end 320 of the display region 2a in the selection mode setting direction 330, the controller 100 cancels the selection mode and sets the operation mode of the electronic device 1 to the normal mode. Consequently, the user can easily cancel the selection mode by releasing the manipulator 60 from the display region 2a.

Figure 10:
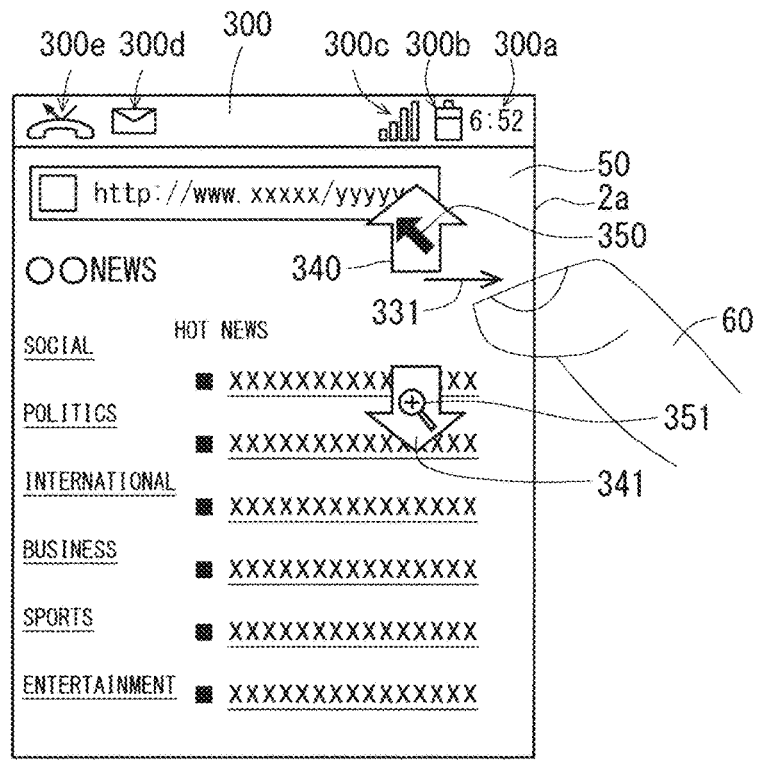
FIG. 10 illustrates a view of an example of the manipulation through the manipulator for the display region of the electronic device.

When the touch panel 130 detects that the manipulator 60 touching or approaching the display region 2a moves in a selection mode canceling direction 331 which is opposite to the selection mode setting direction 330 as shown in FIG. 10 after the manipulator 60 moves in the selection mode setting direction 330 from the right end 321 or the left end 320 in the display region 2a (see FIG. 9), the controller 100 cancels the selection mode to set the operation mode of the electronic device 1 to the normal mode. Consequently, the user can easily cancel the selection mode by simply moving the manipulator 60 in the selection mode canceling direction 331 in the display region 2a.

When the operation mode of the electronic device 1 is changed from the selection mode to the normal mode, the display of the first arrow 340, the second arrow 341, the cursor 350 and the magnifying glass graphic 351 is erased.

Figure 11:
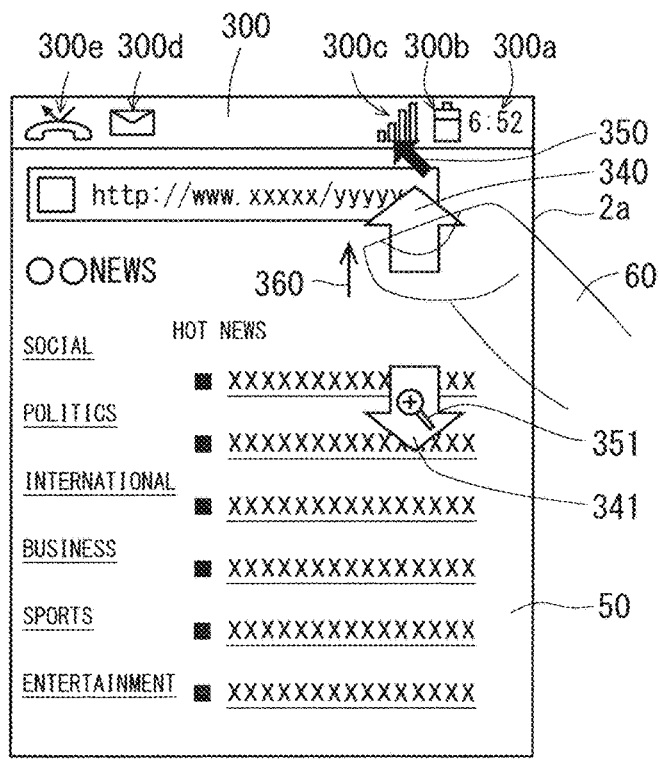
FIG. 11 illustrates a view of an example of the manipulation through the manipulator for the display region of the electronic device.

In the case in which the electronic device 1 is set to the selection mode, the controller 100 sets the operation mode of the electronic device 1 to the cursor display mode when the touch panel 130 detects that the manipulator 60 moves by a predetermined distance or more in the same direction as the direction (the upward direction) indicated by the first arrow 340 in the display region 2a as shown in FIG. 11. Hereinafter, the moving direction of the manipulator 60 for setting the cursor display mode will be referred to as a "cursor display mode setting direction 360". In one embodiment, the cursor display mode setting direction 360 is the same direction as the direction indicated by the first arrow 340, that is, the upward direction.

When the manipulator 60 moves in the cursor display mode setting direction 360 in the display region 2a, the display panel 120 moves the cursor 350 in the cursor display mode setting direction 360 in the display region 2a in response to the movement of the manipulator 60 by the control of the controller 100. More specifically, the display panel 120 moves the cursor 350 in the cursor display mode setting direction 360 in the display region 2a more greatly than a moving amount of the manipulator 60. Even if the manipulator 60 moves in the cursor display mode setting direction 360, consequently, the possibility that the cursor 350 overlaps with the manipulator 60 can be reduced as shown in FIG. 11.

Hereinafter, a manipulation which is performed by the manipulator 60 over the display region 2a and serves to set the electronic device 1 to the cursor display mode will be referred to as a "cursor display mode setting manipulation". In one embodiment, the cursor display mode setting manipulation is a manipulation in which the manipulator 60 moves by a predetermined distance or more in the cursor display mode setting direction 360 as described above.

Figure 12:
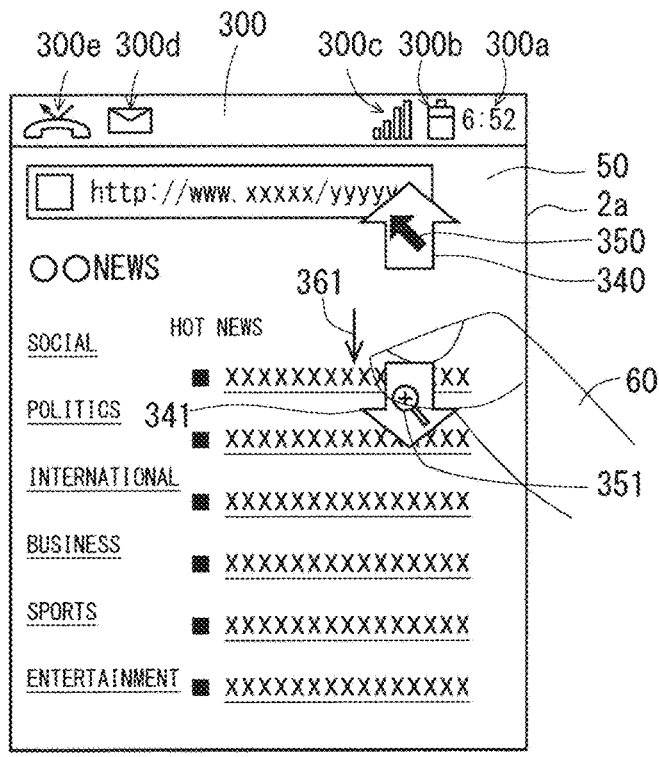
FIG. 12 illustrates a view of an example of the manipulation through the manipulator for the display region of the electronic device.

On the other hand, in the case in which the electronic device 1 is set to be the selection mode, the controller 100 sets the operation mode of the electronic device 1 to the enlargement/reduction mode when the touch panel 130 detects that the manipulator 60 moves in contact by a predetermined distance or more in the same direction as the direction (the downward direction) indicated by the second arrow 341 in the display region 2a as shown in FIG. 12.

Hereinafter, the moving direction of the manipulator 60 for setting the enlargement/reduction mode will be referred to as an "enlargement/reduction mode setting direction 361". In one embodiment, the enlargement/reduction mode setting direction 361 is the same direction as the direction indicated by the second arrow 341, that is, the downward direction. Moreover, a manipulation by the manipulator 60 which is performed over the display region 2a and serves to set the electronic device 1 to the enlargement/reduction mode will be referred to as an "enlargement/reduction mode setting manipulation". In one embodiment, the enlargement/reduction mode setting manipulation is a manipulation in which the manipulator 60 moves by a predetermined distance or more in the enlargement/reduction mode setting direction 361.

In one embodiment, thus, the first arrow 340 in the same direction as the cursor display mode setting direction 360 for setting the operation mode of the electronic device 1 to the cursor display mode is displayed on the display region 2a. Therefore, the user can easily set the operation mode of the electronic device 1 to the cursor display mode by referring to the display of the display region 2a. Moreover, the second arrow 341 in the same direction as the enlargement/reduction mode setting direction 361 for setting the operation mode of the electronic device 1 to the enlargement/reduction mode is displayed on the display region 2a. Therefore, the user can easily set the operation mode of the electronic device 1 to the enlargement/reduction mode by referring to the display of the display region 2a.

In one embodiment, after the selection mode setting manipulation is performed over the display region 2a, the selection mode is canceled when the manipulator 60 touching or approaching the display region 2a moves away from the display region 2a. In order to set the operation mode of the electronic device 1 to the cursor display mode, therefore, the manipulator 60 needs to move in the cursor display mode setting direction 360 without separation from the display region 2a after the selection mode setting manipulation is performed over the display region 2a.

In order to set the operation mode of the electronic device 1 to the enlargement/reduction mode, similarly, the manipulator 60 needs to move in the enlargement/reduction mode setting direction 361 without separation from the display region 2a after the selection mode setting manipulation is performed over the display region 2a.

<Referring to Cursor Display Mode>

Figure 13:
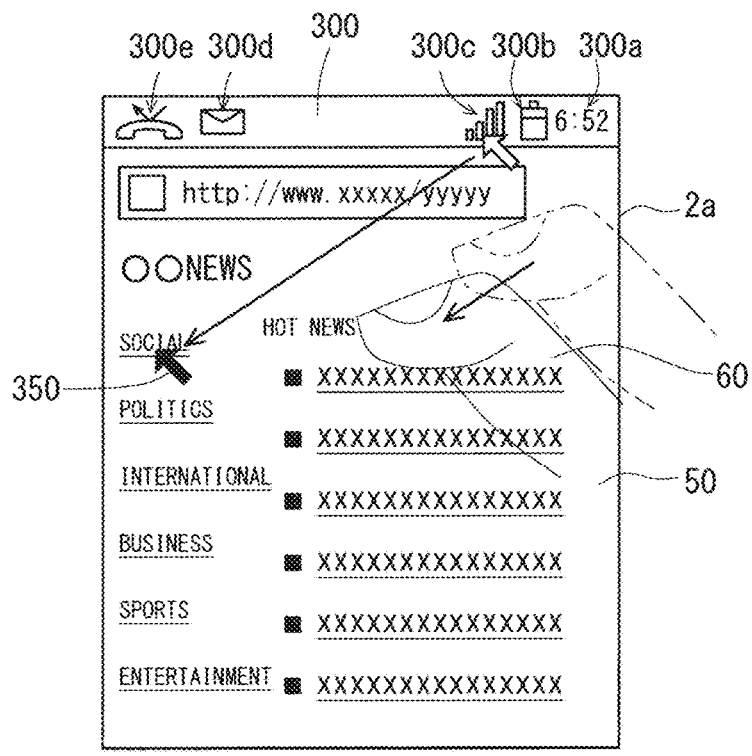
FIG. 13 illustrates a view of an example of the manipulation through the manipulator for the display region of the electronic device.

When the electronic device 1 operates in the cursor display mode, the display panel 120 moves the cursor 350 in the display region 2a in response to the movement of the manipulator 60 in the display region 2a which is detected by the touch panel 130. Consequently, the user can move the cursor 350 in the display region 2a by moving the manipulator 60 in the display region 2a. FIG. 13 illustrates a view of the situation. For explanation, FIG. 13 shows an outlined arrow that indicates the cursor 350 which has not been moved. The same applies to the following drawings.

In the cursor display mode, the display panel 120 moves the cursor 350 in the same direction as a moving direction for the movement of the manipulator 60 in the display region 2a which is detected by the touch panel 130. In the cursor display mode, moreover, the display panel 120 moves the cursor 350 more greatly than the moving amount for the movement of the manipulator 60 in the display region 2a which is detected by the touch panel 130. For example, the display panel 120 moves the cursor 350 in a moving amount which is three times as much as the moving amount of the movement of the manipulator 60 in the display region 2a or more which is detected by the touch panel 130. Consequently, the user can move the manipulator 60 in the display region 2a to move the cursor 350 in the display region 2a in a manner similar to that when moving a mouse of a personal computer, thereby moving a mouse cursor in the display.

In the cursor display mode, moreover, when the touch panel 130 detects that the manipulator 60 moves away from the display region 2a after the manipulator 60 moves in the display region 2a so that a tip of the cursor 350 moves onto a display target in the display region 2a, the electronic device 1 executes processing related to the display target which is indicated by the cursor 350 in the display region 2a. Consequently, the user can cause the electronic device 1 to execute the processing related to the display target by using the cursor 350 to select the display target of the display region 2a. In the cursor display mode, the manipulation of moving the manipulator 60 away from the display region 2a corresponds to the tap manipulation in the normal mode.

For example, when the touch panel 130 detects that the user moves the manipulator 60 in the display region 2a and the cursor 350 is thus moved in such a manner that the tip of the cursor 350 is positioned on the link (the display target) in the web page 50 as shown in FIG. 13, and the manipulator 60 then moves away from the display region 2a, the link indicated by the cursor 350 is selected and the electronic device 1 executes processing related to the link. In other words, the electronic device 1 acquires the web page represented by the selected link from the web server and displays the web page on the display region 2a. In the case in which the cursor 350 indicates the link, that is, the case in which the tip of the cursor 350 is positioned on the link, the display panel 120 may focus on the link by changing a display color of the link or changing a display color of a periphery of the link in such a manner that the user can understand the case.

Figure 14:
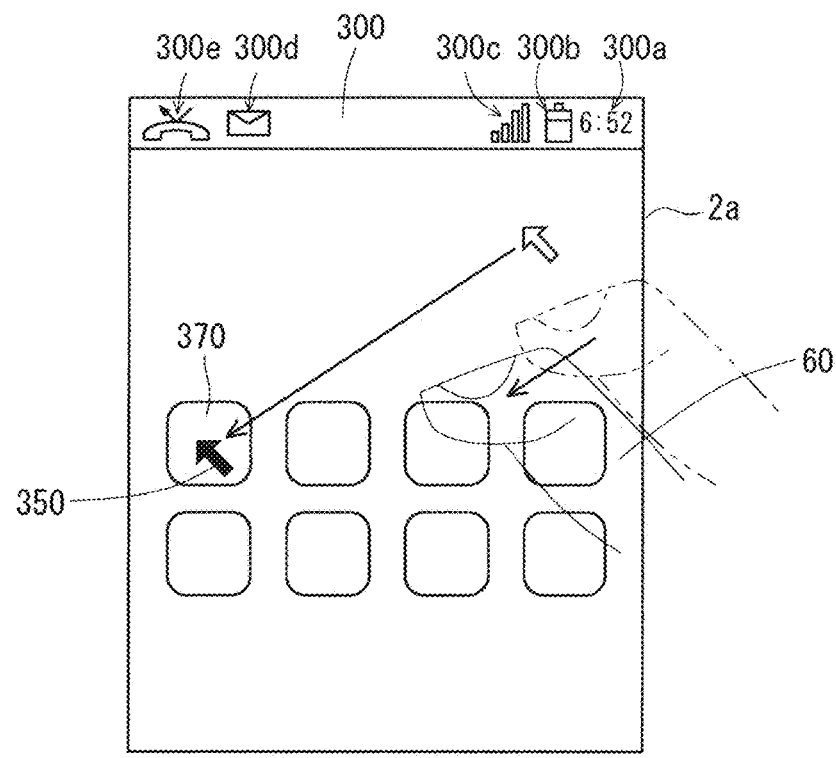
FIG. 14 illustrates a view of an example of the manipulation through the manipulator for the display region of the electronic device.

In the case in which an application icon 370 is displayed on the display region 2a as shown in FIG. 14, moreover, the application icon 370 indicated by the cursor 350 is selected and the electronic device 1 executes processing related to the application icon 370 when the touch panel 130 detects that the user moves the manipulator 60 in the display region 2a to move the cursor 350 in such a manner that the tip of the cursor 350 is positioned on the application icon 370 (the display target), and the manipulator 60 then moves away from the display region 2a. In other words, the controller 100 reads and executes the application 103b corresponding to the selected application icon 370 from the storage module 103. In this case, the controller 100 functions as a processing executing module for executing the processing related to the display target in the display region 2a.

Figure 15:
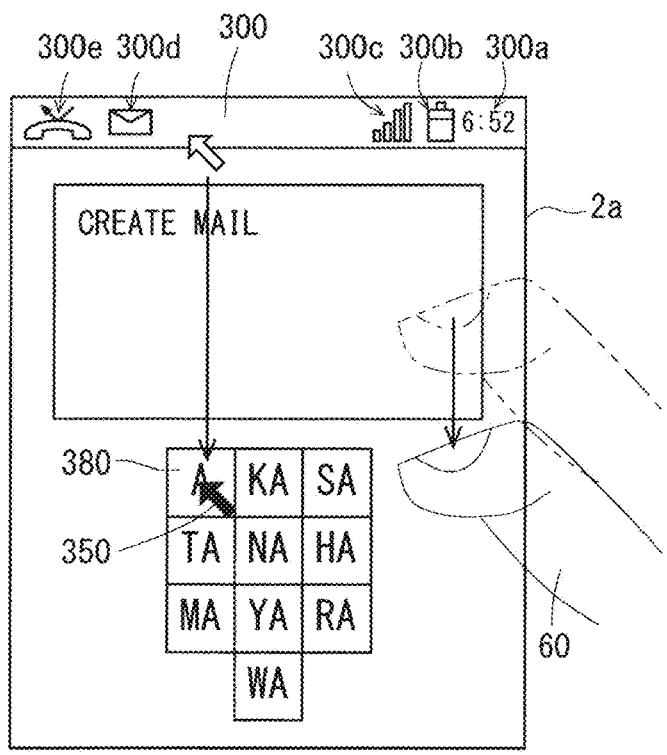
FIG. 15 illustrates a view of an example of the manipulation through the manipulator for the display region of the electronic device.

In the case in which a character input button 380 to be used for creating an electronic mail is displayed on the display region 2a as shown in FIG. 15, moreover, the character input button 380 (the display target) indicated by the cursor 350 is selected and the electronic device 1 executes processing related to the character input button 380 when the touch panel 130 detects that the user moves the manipulator 60 in the display region 2a to move the cursor 350 in such a manner that the tip of the cursor 350 is positioned on the character input button 380 and the manipulator 60 then moves away from the display region 2a. In other words, in the electronic device 1, the controller 100 includes a character corresponding to the selected character input button 380 in an electronic mail which is being created, and the display panel 120 displays the character on the display region 2a. In this case, the controller 100 and the display panel 120 function as a processing executing module for executing the processing related to the display target in the display region 2a.

In the electronic device 1 according to one embodiment, thus, the cursor 350 for executing the processing related to the display targets, for example, the link, the application icon and the like displayed on the display region 2a moves more greatly than the moving amount of the manipulator 60. Accordingly, the user can move the cursor 350 to the end of the display region 2a by slightly moving a thumb (a manipulator) of a single hand also in the case in which the user holds the electronic device 1 by the single hand (see FIGS. 4 and 5), that is, the case in which the thumb manipulates the end of the display region 2a with difficulty. Consequently, the user can cause the electronic device 1 to execute the processing related to the display target displayed on the end of the display region 2a also in the case in which it is hard for the thumb of the single hand holding the electronic device 1 to manipulate the end of the display region 2a. Also in the case in which the user manipulates the electronic device 1 by a single hand, accordingly, he/she can manipulate the electronic device 1 easily. As a result, operability of the electronic device 1 can be enhanced.

In the electronic device 1 according to one embodiment, moreover, when the touch panel 130 detects that the manipulator 60 moves in the display region 2a in such a manner that the cursor 350 indicates the display target such as the link in the display region 2a, and then moves away from the display region 2a, the processing related to the display target indicated by the cursor 350 is executed. By moving the manipulator 60 to move the cursor 350 to the display target and then moving the manipulator 60 away from the display region 2a, accordingly, the user can cause the electronic device 1 to execute the processing related to the display target indicated by the cursor 350. Therefore, the manipulation of the electronic device 1 can be carried out very easily by the user. In other words, the operability of the electronic device 1 can be enhanced.

The user may be allowed to change a relationship between the moving amount of the manipulator 60 and the moving amount of the cursor by manipulating the display region 2a through the manipulator 60.

<Cancellation of Cursor Display Mode>

In one embodiment, when the touch panel 130 detects that the manipulator 60 moves away from the display region 2a in the cursor display mode, the controller 100 cancels the cursor operation mode and sets the operation mode of the electronic device 1 to the normal mode. Consequently, the user can easily cancel the cursor display mode by simply moving the manipulator 60 away from the display region 2a. In the electronic device 1 according to one embodiment, when the manipulator 60 moves away from the display region 2a in a state in which the cursor 350 indicates the display target such as the link, the processing related to the display target is executed and the cursor display mode is cancelled.

The controller 100 may cancel the cursor operation mode and sets the operation mode of the electronic device 1 to the normal mode when the touch panel 130 detects the flick manipulation by the manipulator 60 over the display region 2a in place of or in addition to the cancellation of the cursor operation mode when the manipulator 60 moves away from the display region 2a. Consequently, the user simply performs the flick manipulation by the manipulator 60 over the display region 2a, thereby enabling the cursor display mode to be cancelled easily. The controller 100 may cancel the cursor display mode when the touch panel 130 detects a flick manipulation in a predetermined direction or may cancel the cursor display mode regardless of the direction when the touch panel 130 detects the flick manipulation. Moreover, the controller 100 may set a single direction (for example, an upward direction) or a plurality of directions (for example, upward, downward, rightward and leftward directions) as the predetermined direction of the flick manipulation for canceling the cursor display mode.

<Enlarged/Reduced Display in Cursor Display Mode>

Figure 16:
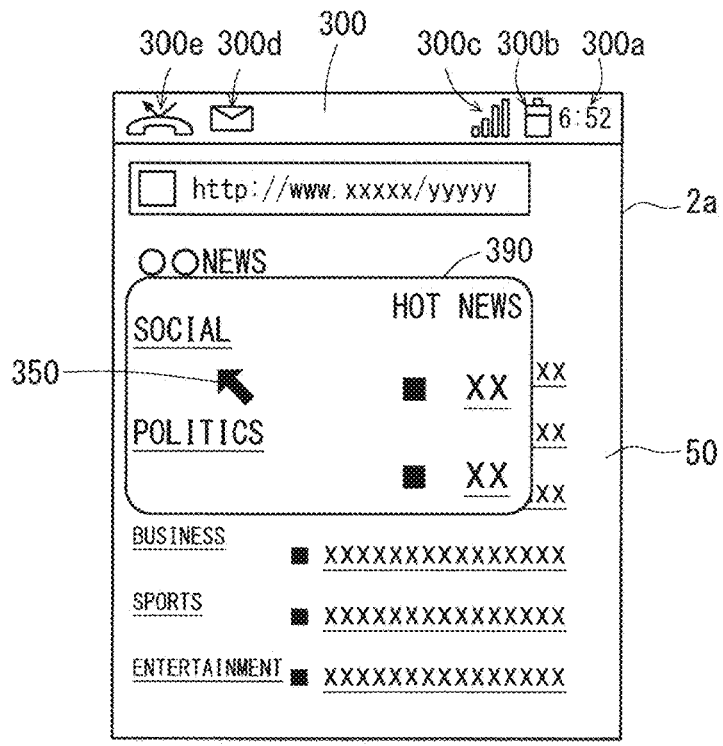
FIG. 16 illustrates a view of an example of the display of the electronic device.

In one embodiment, when the touch panel 130 detects that the manipulator 60 does not move for a predetermined time or more (for example, 1 second or more) in a state in which it touches or approaches the display region 2a in the cursor display mode, the display panel 120 displays an enlarged image (an enlarged screen) 390 representing the enlarged periphery of the cursor 350 in the display region 2a. The enlarged image 390 is displayed in overlap with a display screen which is being displayed on the display region 2a. FIG. 16 illustrates a situation in which the enlarged image 390 is displayed on the display region 2a.

Thus, the enlarged image 390 representing the enlarged periphery of the cursor 350 is displayed on the display region 2a. By indicating the display target such as the link which is enlarged in the enlarged image 390 through the cursor 350, therefore, the user can cause the electronic device 1 to execute the processing related to the display target. Accordingly, the manipulation by the manipulator 60 is facilitated so that the operability of the electronic device 1 can be enhanced.

The display panel 120 may reduce the luminance of the display screen as compared with that before the display of the enlarged image 390 in such a manner that an original display screen on the background of the enlarged image 390 is visually recognized to be darker than the enlarged image 390 in the display region 2a.

Figure 17:
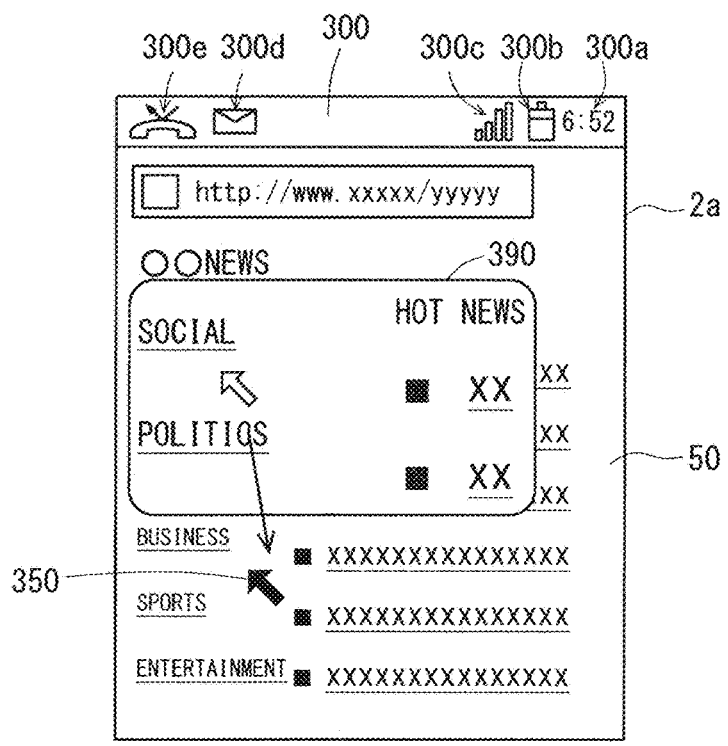
FIG. 17 illustrates a view of an example of the manipulation through the manipulator for the display region of the electronic device.

When the manipulator moves in the display region 2a so that the cursor 350 in the enlarged image 390 moves to the outside of the display of the enlarged image 390 as shown in FIG. 17, the display panel 120 erases the display of the enlarged image 390.

Figure 18:
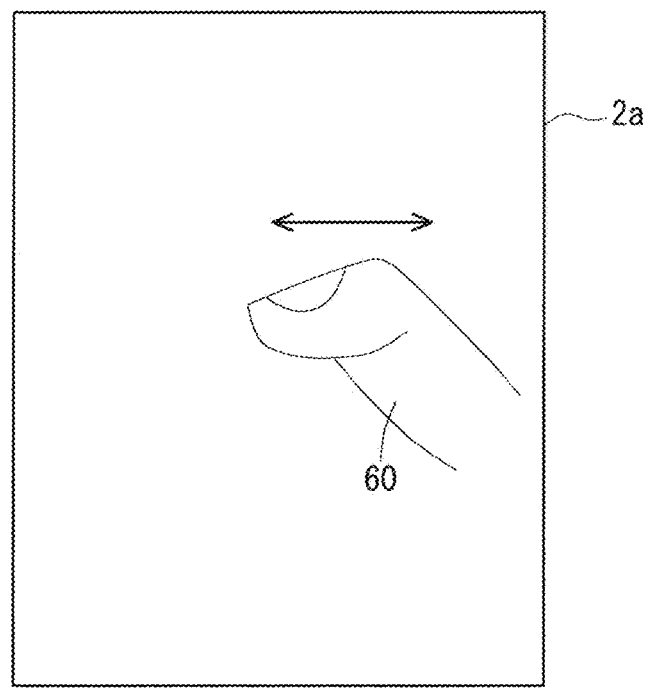
FIG. 18 illustrates a view of an example of the manipulation through the manipulator for the display region of the electronic device.

In one embodiment, moreover, the display panel 120 enlarges the display of the display region 2a at a predetermined magnification when the touch panel 130 detects that the manipulator 60 reciprocates within a predetermined time in a state in which it touches or approaches the display region 2a as shown in FIG. 18. More specifically, when the touch panel 130 detects that the manipulator 60 moves in contact by a predetermined distance or more in a certain direction within a predetermined time in a state in which it touches or approaches the display region 2a and then moves in contact by a predetermined distance or more in a direction opposite to the certain direction, the display panel 120 enlarges the display of the display region 2a.

In one embodiment, furthermore, the display panel 120 reduces the display of the display region 2a to return a display size into an original size when the touch panel 130 detects again that the manipulator 60 reciprocates within a predetermined time in the state in which it touches or approaches the display region 2a while the display of the display region 2a is enlarged.

The display panel 120 may enlarge and reduce the display of the display region 2a with the center of the display region 2a taken as a base point in the enlargement and reduction of the display of the display region 2a. Moreover, the display panel 120 may enlarge and reduce the display of the display region 2a with an initial position of the manipulator 60 (a position for the start of the reciprocation) taken as the base point in the reciprocation of the manipulator 60 within a predetermined time. Moreover, the display panel 120 may enlarge and reduce the display of the display region 2a with a final position of the manipulator 60 (a position for the end of the reciprocation) taken as the base point in the reciprocation of the manipulator 60 within a predetermined time.

<Display of Notice Image in Cursor Display Mode>

Figure 19:
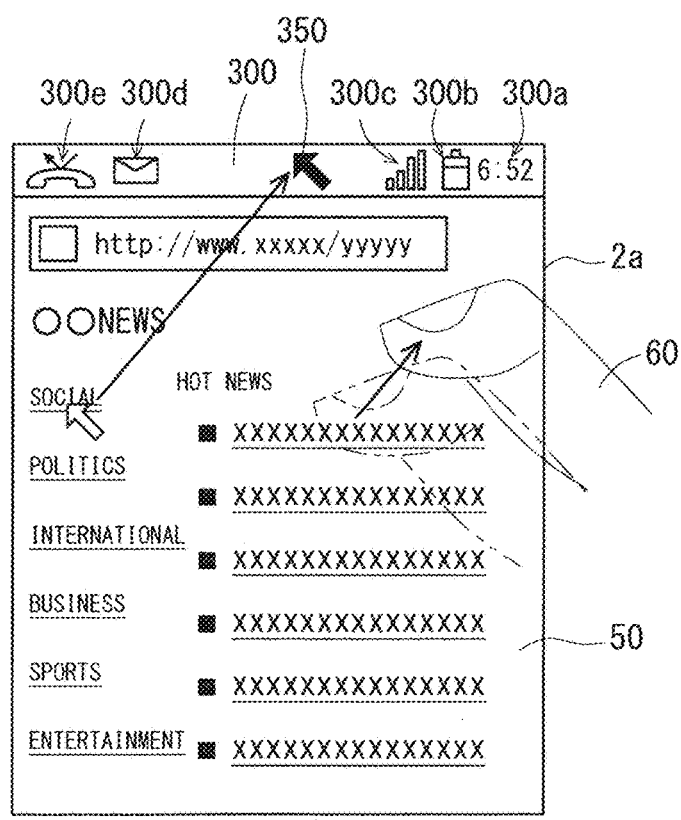
FIG. 19 illustrates a view of an example of the manipulation through the manipulator for the display region of the electronic device.

In one embodiment, the display panel 120 displays a notice image 310 in a region other than the notice region 300 in the display region 2a as shown in FIG. 7 when the touch panel 130 detects that the manipulator 60 moves in the display region 2a so that the cursor 350 moves to the notice region 300 and the manipulator 60 then moves away from the display region 2a as shown in FIG. 19 in the cursor display mode. Consequently, the user can easily cause the electronic device 1 to display the notice image 310 by simply moving the manipulator 60 away from the display region 2a in the state in which the cursor 350 is positioned in the notice region 300.

Figure 20:
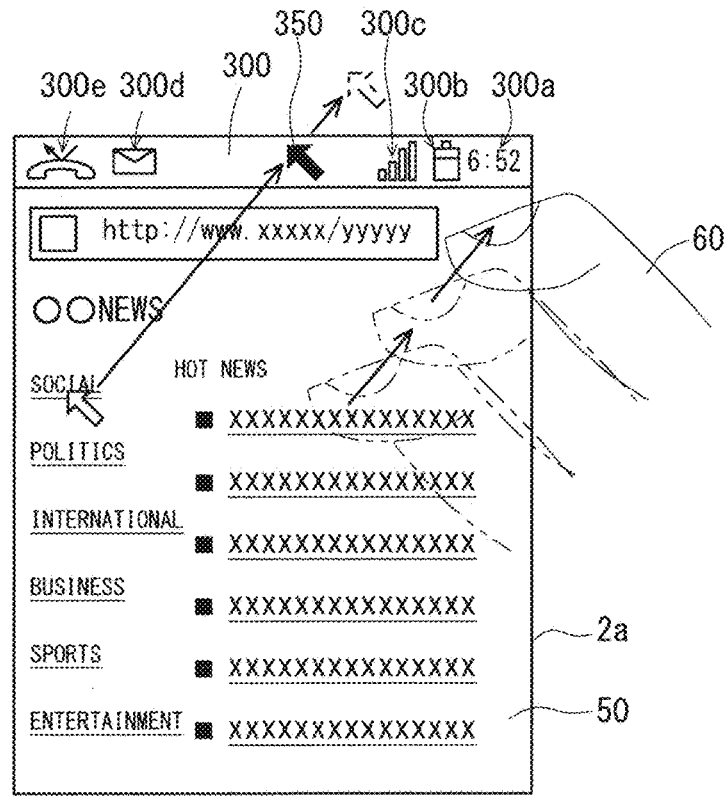
FIG. 20 illustrates a view of an example of the manipulation through the manipulator for the display region of the electronic device.

Moreover, the display panel 120 may display the notice image 310 in a region other than the notice region 300 in the display region 2a when the touch panel 130 detects that the movement of the manipulator 60 to move the cursor 350 to the notice region 300 of the display region 2a and to then move the cursor 350 in a direction from the notice region 300 toward the outside of the display region 2a as shown in FIG. 20 in the cursor display mode. In other words, the display panel 120 may display the notice image 310 when the touch panel 130 detects the movement of the manipulator 60 to pass the cursor 350 through the notice region 300 of the display region 2a, thereby moving the cursor 350 from the upper end of the display region 2a to the outside of the display region 2a. Consequently, the user can easily cause the electronic device 1 to display the notice image 310 by simply moving the manipulator 60 in the display region 2a.

Figure 21:
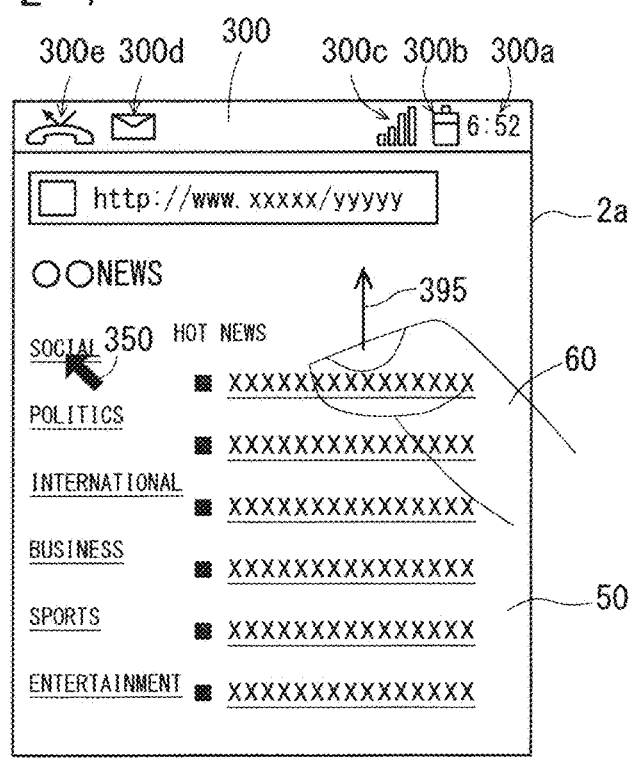
FIG. 21 illustrates a view of an example of the manipulation through the manipulator for the display region of the electronic device.

Moreover, the display panel 120 may display the notice image 310 in a region other than the notice region 300 in the display region 2a when the touch panel 130 detects the flick manipulation for the display region 2a through the manipulator 60 in a direction 395 (an upward direction in the present example) toward the notice region 300 as shown in FIG. 21 in the cursor display mode. At this time, the controller 100 may cancel the cursor operation mode and sets the operation mode of the electronic device 1 to the normal mode.

<Referring to Enlargement/Reduction Mode>

As described above, when the enlargement/reduction mode setting manipulation is performed over the display region 2a by the manipulator 60 in the selection mode, the operation mode of the electronic device 1 is set to the enlargement/reduction mode. In the enlargement/reduction mode, as shown in FIG. 22, the display panel 120 displays, on the display region 2a, a zoom control bar 400 (also referred to as a "zoom slider") for controlling a display magnification. The zoom control bar 400 shows a setting bar 410 indicative of a display magnification which is being set. The display panel 120 displays the zoom control bar 400 close to a portion touched or approached by the manipulator 60 in the display region 2a in such a manner that the zoom control bar 400 is displayed in the vicinity of the manipulator 60 without overlap with the manipulator 60 touching the display region 2a. The zoom control bar 400 is displayed in such a manner that the setting bar 410 is positioned by a portion touched or approached by the manipulator 60 in the display region 2a. In the enlargement/reduction mode, the display of the display region 2a is enlarged and reduced with the center of the display region 2a taken as the base point.

When the touch panel 130 detects that the manipulator 60 moves in the upward direction in the display region 2a, that is, the touch panel 130 detects a slide manipulation in the upward direction as shown in FIG. 23, the display panel 120 enlarges the display of the display region 2a by the control of the controller 100. At this time, the display panel 120 changes the display magnification depending on the moving distance of the manipulator 60. Moreover, the display panel 120 changes the position of the setting bar 410 through the zoom control bar 400 depending on the changed display magnification. In the enlargement/reduction mode, a manipulation which is performed by the manipulator 60 over the display region 2a and serves to enlarge the display of the display region 2a will be hereinafter referred to as an "enlargement executing manipulation". In one embodiment, the enlargement executing manipulation is a manipulation of moving the manipulator 60 in the upward direction in the display region 2a.

Figure 24:
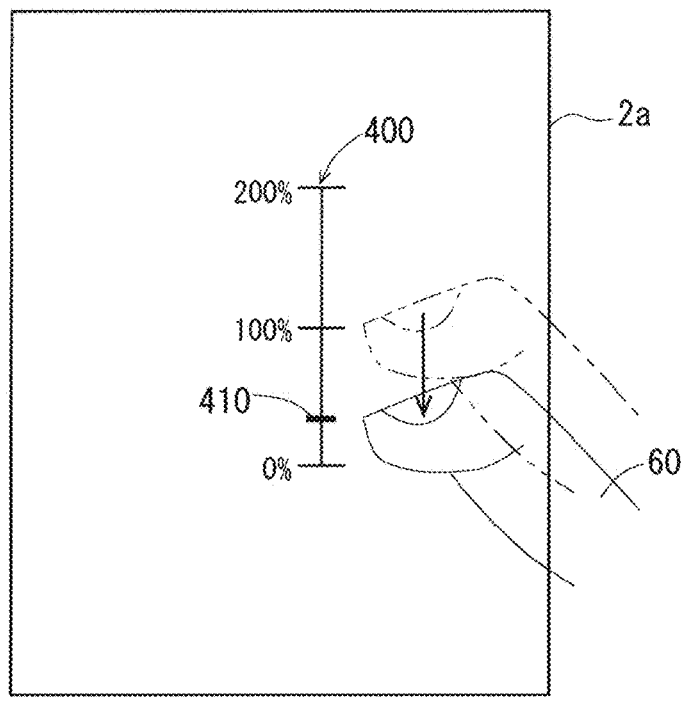
FIG. 24 illustrates a view of an example of the manipulation through the manipulator for the display region of the electronic device.

When the touch panel 130 detects that the manipulator 60 moves in the downward direction in the display region 2a, that is, the touch panel 130 detects a slide manipulation in the downward direction as shown in FIG. 24, moreover, the display panel 120 reduces the display of the display region 2a by the control of the controller 100. At this time, the display panel 120 changes the display magnification depending on the moving distance of the manipulator 60. Furthermore, the display panel 120 changes the position of the setting bar 410 through the zoom control bar 400 depending on the changed display magnification. In the enlargement/reduction mode, a manipulation which is performed by the manipulator 60 over the display region 2a and serves to reduce the display of the display region 2a will be hereinafter referred to as a "reduction executing manipulation". In one embodiment, the reduction executing manipulation is a manipulation of moving the manipulator 60 in the downward direction in the display region 2a.

In one embodiment, when it is detected that the manipulator 60 moves away from the display region 2a in the enlargement/reduction mode, the controller 100 cancels the enlargement/reduction mode and sets the operation mode of the electronic device 1 to the normal mode. Consequently, the user can easily cancel the enlargement/reduction mode by simply moving the manipulator 60 away from the display region 2a. It is desirable that the display magnification in the display region 2a after the cancellation of the enlargement/reduction mode should be a display magnification set finally in the enlargement/reduction mode.

Figure 25:
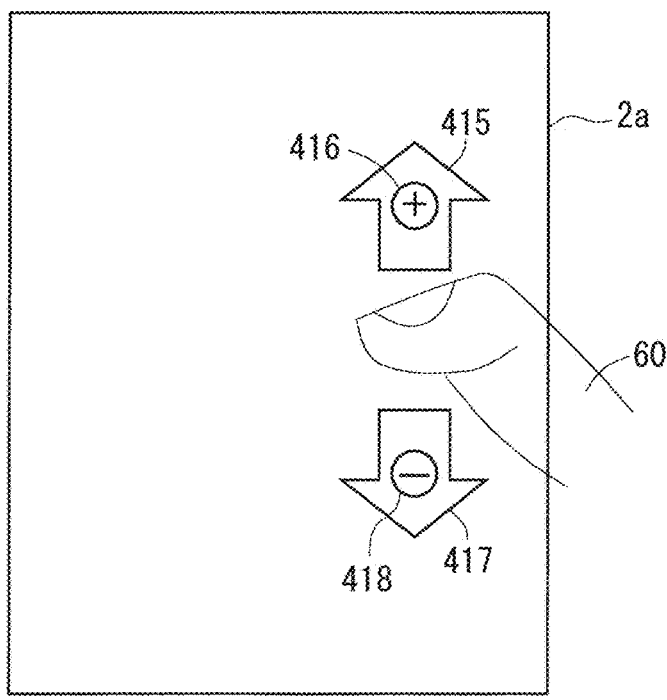
FIG. 25 illustrates a view of an example of the manipulation through the manipulator for the display region of the electronic device.

In the enlargement/reduction mode, as shown in FIG. 25, an upward arrow 415 and a downward arrow 417 may be displayed in the display region 2a in place of the zoom control bar 400. The upward arrow 415 and the downward arrow 417 are displayed on upper and lower sides of the portion touched or approached by the manipulator 60 in the display region 2a, respectively. In the example of FIG. 25, a graphic 416 indicative of enlargement processing is displayed in overlap with the upward arrow 415 and a graphic 418 indicative of reduction processing is displayed in overlap with the downward arrow 417. It is desirable that the upward arrow 415, the downward arrow 417 and the graphics 416 and 418 should be displayed without overlap with the manipulator 60.

Also in the example of the display illustrated in FIG. 25, in the same manner as described above, the display of the display region 2a is enlarged or reduced in response to the movement of the manipulator 60 in the display region 2a. In other words, when the touch panel 130 detects that the manipulator 60 moves in the upward direction in the display region 2a, the display panel 120 enlarges the display of the display region 2a in a magnification corresponding to the moving amount of the manipulator 60. When the manipulator 60 moves in the upward direction in the display region 2a, a display mode of the upward arrow 415 may be changed. For example, the size of the upward arrow 415 may be increased or a display color of the upward arrow 415 may be changed. When the touch panel 130 detects that the manipulator 60 moves in the downward direction in the display region 2a, moreover, the display panel 120 reduces the display of the display region 2a in a magnification corresponding to the moving amount of the manipulator 60. When the manipulator 60 moves in the downward direction in the display region 2a, a display mode of the downward arrow 417 may be changed. For example, the size of the downward arrow 417 may be increased or a display color of the downward arrow 417 may be changed.

In the electronic device 1 according to one embodiment, thus, the display of the display region 2a is enlarged or reduced depending on a moving direction when the manipulator 60 moves in the display region 2a. Consequently, the user can enlarge or reduce the display of the display region 2a by a simple manipulation for the electronic device 1.

The selection mode setting manipulation, the cursor display mode setting manipulation and the enlargement/reduction mode setting manipulation described above are only illustrative and it is also possible to adopt, as these manipulations, other manipulations to be performed by the manipulator 60 over the display region 2a. For example, it is also possible to perform, as the selection mode setting manipulation, the tap manipulation continuously three times or more within a predetermined time over the display region 2a.

Moreover, the selection mode setting direction 330, the cursor display mode setting direction 360 and the enlargement/reduction mode setting direction 361 according to one embodiment are only illustrative and other directions may be adopted for these directions. For example, the cursor display mode setting direction 360 and the enlargement/reduction mode setting direction 361 may be set to be a leftward and upward direction and a rightward and upward direction, respectively.

Furthermore, the manipulation which is performed by the manipulator 60 over the display region 2a and serves to cancel the selection mode, the cursor display mode and the enlargement/reduction mode are also illustrative, and other manipulations to be performed by the manipulator 60 over the display region 2a may be adopted as these manipulations. Moreover, the moving direction of the manipulator 60 in the enlargement executing manipulation and the reduction executing manipulation in the enlargement/reduction mode according to one embodiment are also illustrative and other directions may be adopted for these moving directions. In addition, the enlargement executing manipulation and the reduction executing manipulation in the enlargement/reduction mode described above are also illustrative, and other manipulations to be performed by the manipulator 60 over the display region 2a may be adopted for these manipulations.

<Various Variants>

Various variants of the electronic device 1 according to one embodiment will be described below.

<Setting of Acceptance Region to Display Region 2a>

In one variant, the controller 100 sets, to the display region 2a, an acceptance region 420 for accepting the movement of the manipulator 60 to move the cursor 350 in the display region 2a when the operation mode of the electronic device 1 is set to the cursor display mode. The display panel 120 moves the cursor 350 only when the manipulator 60 moves in the acceptance region 420. Accordingly, the acceptance region 420 serves as a mouse pad over which a mouse used in a personal computer or the like is to be moved.

Figure 26:
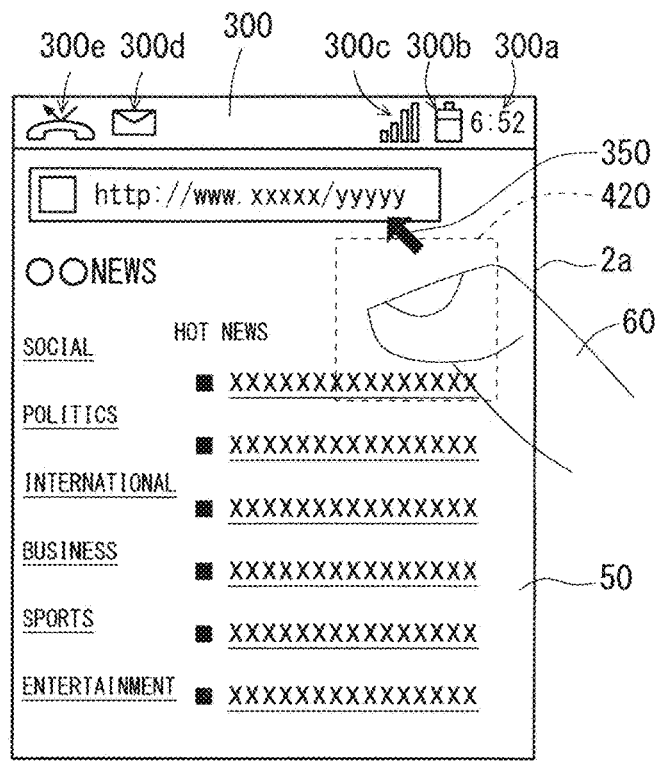
FIG. 26 illustrates a view of an example of the display of the electronic device.

FIG. 26 illustrates a view of a situation in which the acceptance region 420 is set to the display region 2a. When a cursor display mode setting manipulation is performed over the display region 2a, the controller 100 sets the acceptance region 420 to the display region 2a so as to include a portion in the display region 2a that the manipulator 60 touches or approaches at the end of the movement of the manipulator 60 in the cursor display mode setting manipulation. The display panel 120 moves the cursor 350 as described above only when the manipulator 60 moves in the acceptance region 420.

In one variant, moreover, the controller 100 does not cancel the cursor display mode when the touch panel 130 detects that the manipulator 60 moves away from the display region 2a but cancels the cursor display mode when the touch panel 130 detects that the manipulator 60 does not perform a manipulation within a predetermined time or more (for example, 2 seconds or more) over the acceptance region 420.

Furthermore, the electronic device 1 according to one variant treats the manipulation to be performed by the manipulator 60 over a region other than the acceptance region 420 in the display region 2a in the same manner as the manipulation to be performed by the manipulator 60 over the display region 2a in the normal mode. For example, when the tap manipulation is performed over a portion where a link in a web page is displayed in a region of the display region 2a other than the acceptance region 420, the web page indicated by the link is acquired from a web server and is displayed on the display region 2a in the electronic device 1. When there is performed the slide manipulation in a vertical direction over a region of the display region 2a other than the acceptance region 420, moreover, the display of the display region 2a is scrolled.

Figure 27:
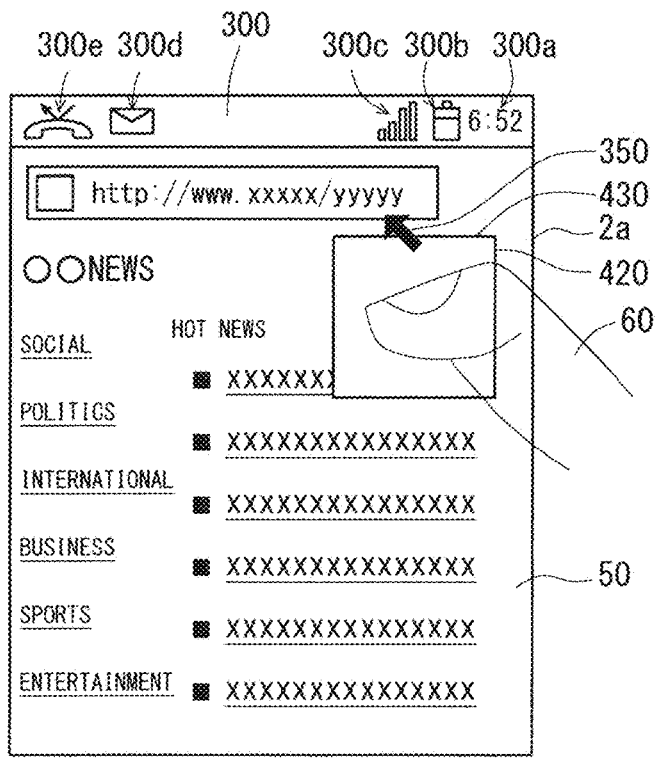
FIG. 27 illustrates a view of an example of the display of the electronic device.

Referring to the acceptance region 420, display to specify the range may be performed in the display region 2a or not. FIG. 27 illustrates a situation in which the display panel 120 displays, in the display region 2a, an acceptance region image 430 indicative of the acceptance region 420 in order to specify the range of the acceptance region 420. As shown in FIG. 27, the acceptance region image 430 is displayed in overlap with a display screen displayed originally by the display region 2a (a display screen before the display of the acceptance region image 430). The size of the acceptance region image 430 is equal to that of the acceptance region 420 and a display position of the acceptance region image 430 in the display region 2a is the same as that of the acceptance region 420 in the display region 2a.

Figure 28:
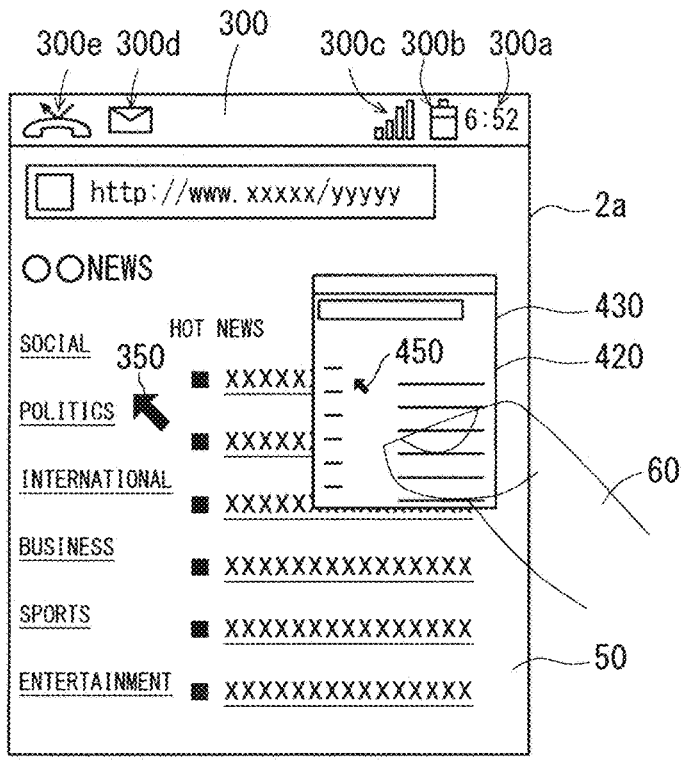
FIG. 28 illustrates a view of an example of the display of the electronic device.

The acceptance region image 430 may be any image if the position and range of the acceptance region 420 in the display region 2a are indicated. For example, a transmissive image may be displayed as the acceptance region image 430 in such a manner that an image of a background (a lower side) can be seen. At this time, a transmissive image having a high luminance may be displayed as the acceptance region image 430 in such a manner that the acceptance region image 430 appears shining. Moreover, an image indicative of only a frame having a size equal to the size of the acceptance region 420 may be displayed as the acceptance region image 430. At this time, a part of the display screen displayed originally by the display region 2a is displayed on an inside of the frame indicated by the acceptance region image 430. Moreover, a reduced screen obtained by reducing the display screen including the cursor 350 which is displayed on the display region 2a may be displayed as the acceptance region image 430. FIG. 28 illustrates a view of the situation.

As shown in FIG. 28, in the case in which the reduced screen obtained by reducing the display screen displayed on the display region 2a is displayed as the acceptance region image 430, a reduced version 450 of the cursor 350 is shown in the acceptance region image 430. The reduced version 450 of the cursor 350 moves in the acceptance region image 430 when the cursor 350 moves in the display region 2a. Accordingly, the user can specify the position of the cursor 350 in the display region 2a by seeing the reduced version 450 of the cursor 350 in the acceptance region image 430. Therefore, the user can specify the position of the cursor 350 in the display region 2a by seeing the vicinity of the manipulator 60 which is being moved over the acceptance region 420. Consequently, it is possible to easily perform the manipulation over the electronic device 1.

Moreover, the acceptance region image 430 may be displayed all the time during the operation of the electronic device 1 in the cursor display mode or may be displayed temporarily. In other words, the electronic device may always or temporarily give the user a notice of the position and range of the acceptance region 420 set to the display region 2a in the cursor display mode.

When the acceptance region image 430 is temporarily displayed on the display region 2a, the acceptance region image 430 may be displayed in a certain time from a time that the operation mode of the electronic device 1 is set to the cursor display mode. Moreover, the acceptance region image 430 may be displayed for a certain time since the manipulator 60 resumes the manipulation in the acceptance region 420 after the manipulator 60 stops the manipulation in the acceptance region 420.

<Variant of Operation Mode>

The electronic device 1 does not need to have the enlargement/reduction mode as the operation mode. In this case, the selection mode is not required. In this case, moreover, the same manipulation as the selection mode setting manipulation may be adopted as a cursor display mode setting manipulation, for example.

In the case in which the same manipulation as the selection mode setting manipulation is adopted as the cursor display mode setting manipulation, the controller 100 sets the operation mode of the electronic device 1 to the cursor display mode when the touch panel 130 detects that the manipulator 60 moves inward from the right end 321 of the display region 2a by a predetermined distance or more when the operation mode of the electronic device 1 is the normal mode. In the case in which the operation mode of the electronic device 1 is the normal mode, moreover, the controller 100 sets the operation mode of the electronic device 1 to the cursor display mode when the touch panel 130 detects that the manipulator 60 moves inward from the left end 320 of the display region 2a by a predetermined distance or more. In the same manner as the case in which the selection mode is canceled, then, the controller 100 cancels the cursor display mode when the touch panel 130 detects that the manipulator 60 moves in contact inward from the right end 321 or the left end 320 of the display region 2a and is then moved toward the right end 321 or the left end 320 without separation from the display region 2a.

As the type of a mode to be selected in the operation of the electronic device 1 in the selection mode, furthermore, the electronic device 1 may include modes other than the cursor display mode and the enlargement/reduction mode. For example, the electronic device 1 may include a display mode for displaying a display target to which processing (a function) is related an application icon or the like. A variant of the electronic device 1 in this case will be described below in detail. In order to make a distinction from the cursor display mode, the display mode will be hereinafter referred to as a second display mode.

The electronic device 1 according to one variant includes, as second display modes, a first icon display mode for displaying an application icon to execute the recently-executed application 103*b* and a second icon display mode for displaying an application icon selected by the user. In the case in which the operation mode of the electronic device 1 is the selection mode, the user selects one of the cursor display mode, enlargement/reduction mode, the first icon display mode and the second icon display mode. In the case in which the first icon display mode and the second icon display mode do not particularly need to be distinguished from each other, they will be hereinafter referred to as an "icon display mode". In one variant, a state in which the electronic device 1 does not operate in the cursor display mode, the enlargement/reduction mode, the first icon display mode, the second icon display mode and the selection mode is the normal mode.

Figure 29:
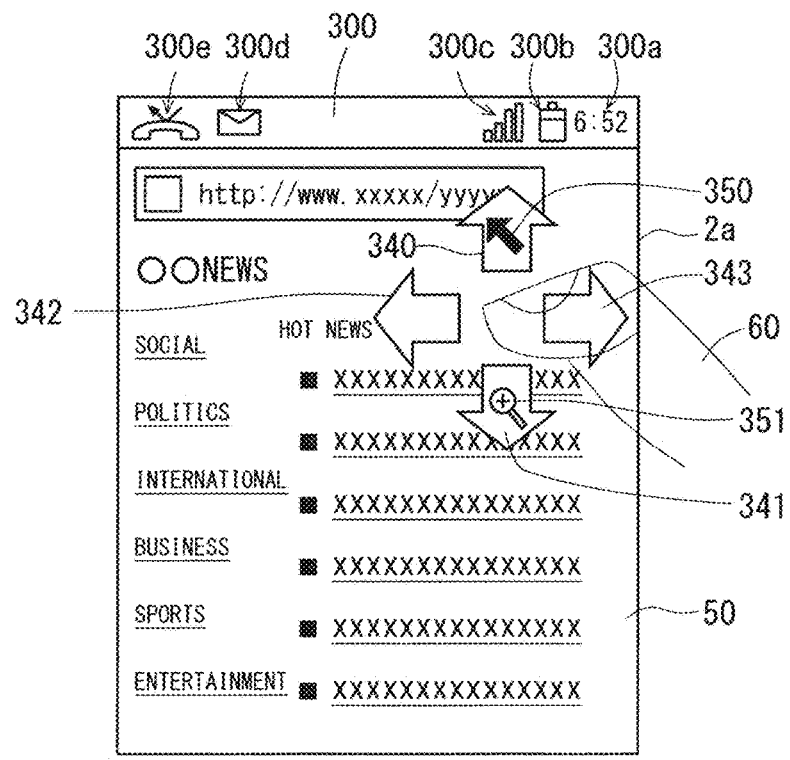
FIG. 29 illustrates a view of an example of the display of the electronic device.

In one variant, when the touch panel 130 detects the selection mode setting manipulation performed by the manipulator 60 over the display region 2*a* and the operation mode of the electronic device 1 is set to be the selection mode, a third arrow 342 in a leftward direction and a fourth arrow 343 in a rightward direction are displayed on left and right sides, respectively, of a portion touched or approached by the manipulator 60 in addition to the first arrow 340 and the second arrow 341 in the display region 2*a* as shown in FIG. 29.

Figure 30:
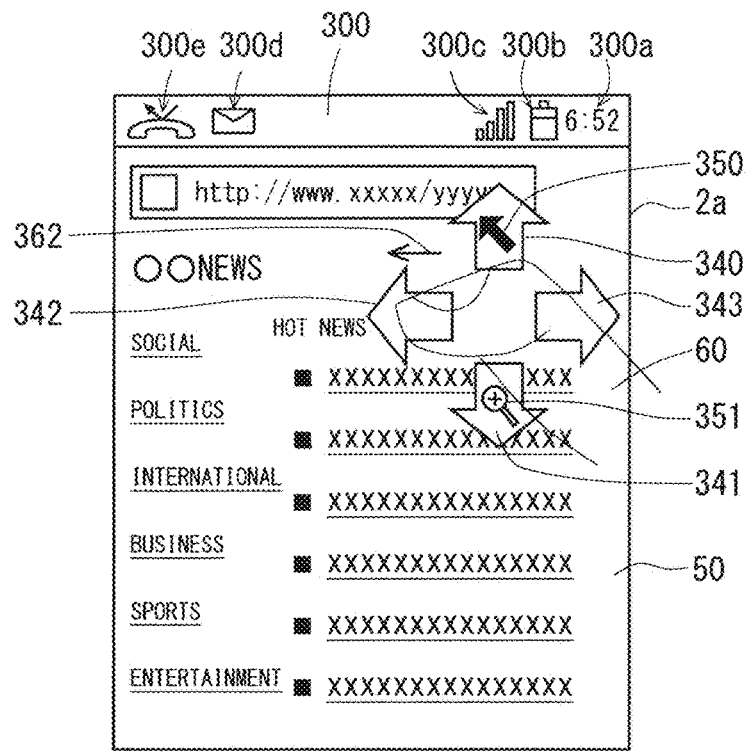
FIG. 30 illustrates a view of an example of the manipulation through the manipulator for the display region of the electronic device.

In the case in which the electronic device 1 is set to be the selection mode, the controller 100 sets the operation mode of the electronic device 1 to the first icon display mode when the touch panel 130 detects that the manipulator 60 moves in a first icon display mode setting direction 362 which is the same as the direction (the leftward direction) indicated by the third arrow 342 in the display region 2*a* as shown in FIG. 30. The manipulation which is performed by the manipulator 60 over the display region 2*a* and serves to set the electronic device 1 to the first icon display mode will be hereinafter referred to as a "first icon display mode setting manipulation". In one embodiment, the "first icon display mode setting manipulation" is a manipulation of moving the manipulator 60 in the first icon display mode setting direction 362 as described above.

Figure 31:
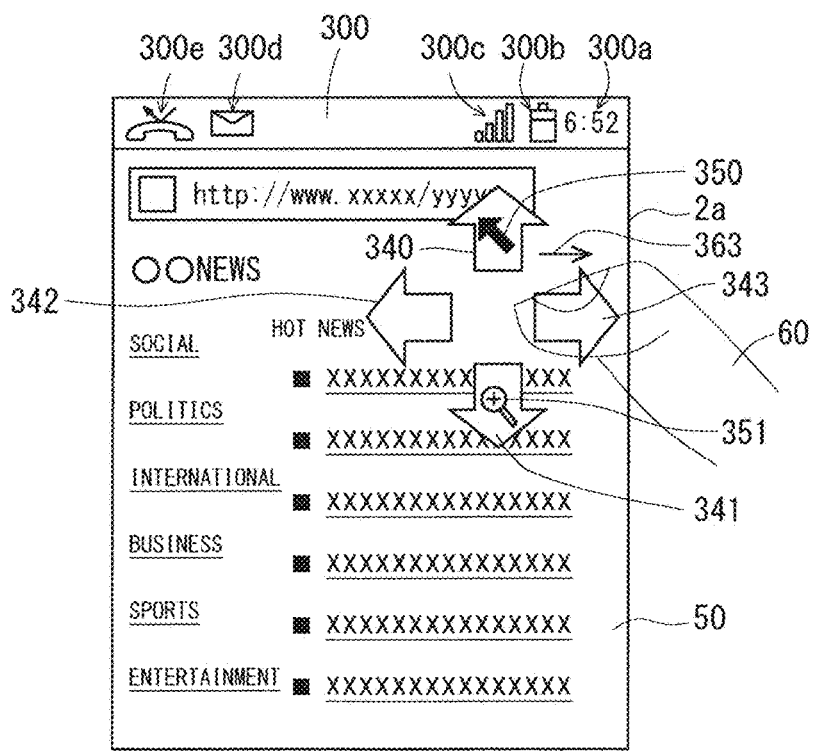
FIG. 31 illustrates a view of an example of the manipulation through the manipulator for the display region of the electronic device.

In the case in which the electronic device 1 is set to the selection mode, moreover, the controller 100 sets the operation mode of the electronic device 1 to the second icon display mode when the touch panel 130 detects that the manipulator 60 moves in a second icon display mode setting direction 363 which is the same as the direction (the rightward direction) indicated by the fourth arrow 343 in the display region 2*a* as shown in FIG. 31.

The manipulation which is performed by the manipulator 60 over the display region 2*a* and serves to set the electronic device 1 to the second icon display mode will be hereinafter referred to as a "second icon display mode setting manipulation". In one embodiment, the "second icon display mode setting manipulation" is a manipulation of moving the manipulator 60 in the second icon display mode setting direction 363.

Also in one variant, when the touch panel 130 detects that the selection mode setting manipulation is performed over the display region 2*a* and the manipulator 60 touching or approaching the display region 2*a* then moves away from the display region 2*a*, the controller 100 cancels the selection mode.

When the touch panel 130 detects that the manipulator 60 moves from the right end 321 or the left end 320 of the display region 2*a* in the selection mode setting direction 330 and the manipulator 60 touching or approaching the display region 2*a* then moves in the selection mode canceling direction 331 to be a direction opposite to the selection mode setting direction 330 as shown in FIG. 10 described above, moreover, the controller 100 cancels the selection mode.

As in one variant, in the case in which the selection mode canceling direction 331 and the second icon display mode setting direction 363 are coincident with each other, the manipulation for canceling the selection mode and the second iron display mode setting manipulation compete with each other. In this case, accordingly the controller 100 determines whether the selection mode is to be cancelled or the operation mode of the electronic device 1 is to be set to the second icon display mode depending on the moving distance of the manipulator 60.

More specifically, when the touch panel 130 detects that the manipulator 60 moves from the right end 321 or the left end 320 of the display region 2*a* in the selection mode setting direction 330 and then moves by a predetermined distance or more in the selection mode canceling direction 331 (the second icon display mode setting direction 363) without separation from the display region 2*a*, the controller 100 cancels the selection mode.

On the other hand, when the touch panel 130 detects that the manipulator 60 moves from the right end 321 or the left end 320 of the display region 2*a* in the selection mode setting direction 330, and then moves by a shorter distance than a predetermined distance in the second icon display mode setting direction 363 (the selection mode canceling direction 331) without separation from the display region 2*a*, the controller 100 sets the operation mode of the electronic device 1 to the second icon display mode. In other words, when the touch panel 130 detects that the manipulator 60 moves in contact from the right end 321 or the left end 320 of the display region 2*a* in the selection mode setting direction 330, and then moves by the shorter distance than the predetermined distance in the second icon display mode setting direction 363 without separation from the display region 2*a* and stops, the controller 100 sets the operation mode of the electronic device 1 to the second icon display mode.

Figure 32:
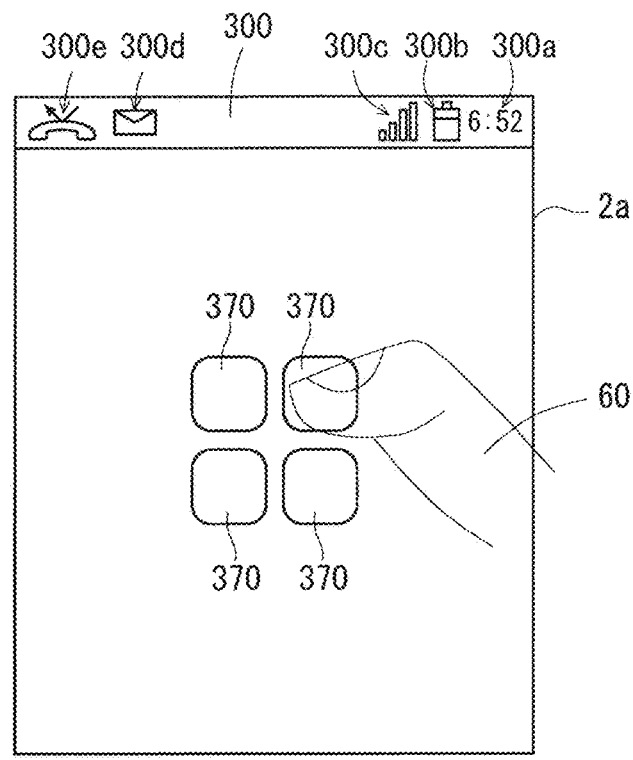
FIG. 32 illustrates a view of an example of the display of the electronic device.

FIG. 32 illustrates a view of an example of the display of the application icon 370 in the icon display mode. As shown in FIG. 32, in the icon display mode, the application icons 370 are displayed in a central part of the display region 2*a*, for example. The application icon 370 for executing the recently-executed application 103*b* is displayed in the first icon display mode, and the application icon 370 selected by the user is displayed in the second icon display mode. The user can determine the application icon 370 displayed in the second icon display mode by manipulating the display region 2*a* through the manipulator 60 when the operation mode of the electronic device 1 is set to the normal mode.

In the icon display mode, the manipulation of moving the manipulator 60 away from the display region 2*a* on the display of the application icon 370 in the display region 2*a* is a manipulation for selecting the application icon 370. In other words, in the case in which the operation mode of the electronic device 1 is the icon display mode, the application icon 370 is selected and the controller 100 reads the application 103*b* corresponding to the selected application icon 370 from the storage module 103 and executes the application 103*b* when the touch panel 130 detects that the manipulator 60 moves to be positioned on the display of the application icon 370 in the display region 2*a* and then moves away from the display region 2*a* in that position.

On the other hand, in the case in which the operation mode of the electronic device 1 is set to be the icon display mode, the controller 100 cancels the icon display mode and sets the operation mode of the electronic device 1 to the normal mode when the touch panel 130 detects that the manipulator 60 moves to be positioned in a portion of the display region 2*a* where the application icon 370 is not displayed, and then moves away from the display region 2*a* in that position.

In the icon display mode, thus, the application icon 370 is displayed on a central part of the display region 2*a*. Therefore, the user can easily select the application icon 370 with any of a thumb of a right hand and a thumb of a left hand. Accordingly, the user can easily manipulate the electronic device 1 by a single hand.

Although the cursor display mode setting direction 360, the enlargement/reduction mode setting direction 361, the first icon display mode setting direction 362 and the second icon display mode setting direction 363 are set to be the upward, downward, leftward and the rightward directions respectively in the example described above, they may be set to be other directions. For example, the cursor display mode setting direction 360, the enlargement/reduction mode setting direction 361, the first icon display mode setting direction 362 and the second icon display mode setting direction 363 may be set to be the rightward, leftward, upward and downward directions, respectively.

Figure 33:
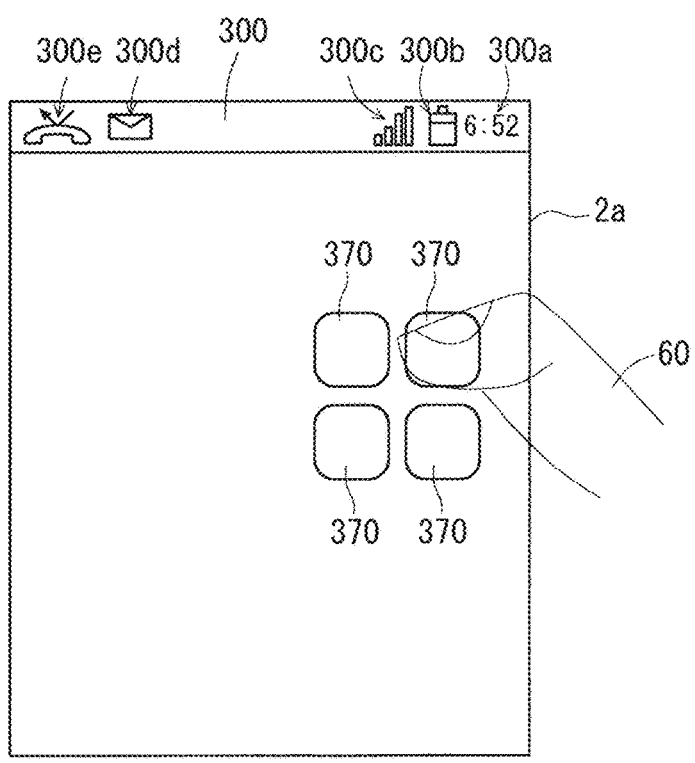
FIG. 33 illustrates a view of an example of the display of the electronic device.

When the manipulator 60 moves from the right end 321 of the display region 2*a* in the selection mode setting direction 330 so that the operation mode of the electronic device 1 is set to be the selection mode and is then set to be the icon display mode, moreover, the display panel 120 may display the application icon 370 in a half region on a right side of the display region 2*a* as shown in FIG. 33. In the case in which the user holds the electronic device 1 by the right hand, consequently, he/she can easily select the application icon 370 with the thumb of the right hand. When the manipulator 60 moves from the left end 320 of the display region 2*a* in the selection mode setting direction 330 so that the operation mode of the electronic device 1 is set to be the selection mode and is then set to be the icon display mode, similarly, the display panel 120 may display the application icon 370 in a half region on a left side of the display region 2*a*. In the case in which the user holds the electronic device 1 by the left hand, consequently, he/she can easily select the application icon 370 with the thumb of the left hand.

Although the electronic device 1 has the first and second icon display modes as the second display mode in the example described above, moreover, it may have one of the first and second icon display modes.

Although only the application icon is displayed on the display region 2*a* in the second display mode in the example described above, furthermore, a display target other than the application icon may be displayed together with the application icon or only display targets other than the application icon may be displayed.

When the display targets other than the application icon are displayed in the second display mode, a luminance changing button represented by a graphic or the like to change the luminance of the display region 2*a* may be displayed on the display region 2*a*, for example. In this case, the luminance changing button is selected when the touch panel 130 detects that the manipulator 60 moves away from the display region 2*a* on the display of the luminance changing button in the display region 2*a*. The controller 100 changes the luminance of the display region 2*a* as processing related to the selected luminance changing button.

In the case in which the electronic device 1 has a communication function using a wireless LAN (Local Area Network) (hereinafter referred to as a "wireless LAN function"), moreover, a wireless LAN setting button represented by a graphic or the like which serves to turn ON/OFF the wireless LAN function in the electronic device 1 may be displayed, on the display region 2*a*, as the display target other than the application icon in the second display mode, for example. In this case, when the touch panel 130 detects that the manipulator 60 moves away from the display region 2*a* on the display of the wireless LAN setting button in the display region 2*a*, the wireless LAN setting button is selected. As the processing related to the selected wireless LAN setting button, the controller 100 turns ON the wireless LAN function if it is currently OFF, and turns OFF the wireless LAN function if it is currently ON.

<Other Variant>

Although the description has been given by taking, as an example, the case in which the present disclosure is applied to a portable telephone in the example described above, the present disclosure can also be applied to electronic devices other than the portable telephone.

Although the present disclosure has been described in detail, moreover, the above description is only illustrative in all aspects and the present disclosure is not restricted thereto. Numerous variants which are not illustrated can be supposed without departing from the scope of the present disclosure.

The invention claimed is:

1. An electronic device comprising:
a display;
a touch panel configured to detect a touch operation to the display; and
at least one processor configured to, in a cursor display mode in which the display displays a cursor,
during a continuous touch operation that moves a contact point across the display, move the cursor on the display, such that the movement of the cursor is greater than the movement of the contact point for as long as the continuous touch operation is not released,
when the contact point of the continuous touch operation remains motionless for a non-zero predetermined time period,
display an image, comprising an enlarged portion of a display screen surrounding the cursor on the display, in a foreground of the display so as to overlap the display screen as a background of the display, and
reduce a luminance of the display screen as the background, so as to be visually darker than the image, comprising the enlarged portion of the display screen, in the foreground, and,
when the continuous touch operation is released while a location of the cursor corresponds to a location of a display target on the display, execute processing related to the display target.

2. The electronic device according to claim 1, wherein the at least one processor, in the cursor display mode, cancels the cursor display mode when the continuous touch operation is released.

3. The electronic device according to claim 1, wherein the at least one processor, in the cursor display mode, cancels the cursor display mode when the continuous touch operation is ended with a flick.

4. The electronic device according to claim 1, wherein the at least one processor, in the cursor display mode, removes the image from the display when the cursor is moved outside a boundary of the image.

5. The electronic device according to claim 1, wherein the at least one processor, in the cursor display mode, enlarges a portion of the display when the contact point reciprocates within a predetermined time period, wherein the reciprocation comprises movement of the contact point in a first direction from a base point by at least a predetermined distance, followed by movement of the contact point in a second direction that is opposite to the first direction by at least the predetermined distance, within a predetermined time.

6. The electronic device according to claim 1, wherein the at least one processor is further configured to:
   display a notification region on an end portion of the display;
   detect an event in the electronic device;
   display an icon indicating an occurrence of the event in the notification region; and,
   in the cursor display mode, when the contact point of the continuous touch is moved to the notification region and then moved toward an outside of the notification region, display information related to the event in a region outside of the notification region.

7. The electronic device according to claim 1, wherein the at least one processor is further configured to:
   display a notification region on an end portion of the display;
   detect an event in the electronic device;
   display an icon indicating an occurrence of the event in the notification region; and,
   in the cursor display mode, when the continuous touch operation is released with a flick motion toward the notification region, display information related to the event in a region outside of the notification region.

8. The electronic device according to claim 1, wherein the at least one processor switches from a prior mode into the cursor display mode in response to a touch operation that begins on an edge of the display and moves inward in a first direction on the display.

9. The electronic device according to claim 8, wherein the at least one processor cancels the cursor display mode in response to a touch operation that begins on an interior of the display and moves outward in a second direction, which is opposite to the first direction, towards the edge of the display.

10. The electronic device according to claim 1, wherein the at least one processor is further configured to:
    switch to a selection mode in response to a first touch operation; and,
    while in the selection mode,
       switch to the cursor display mode in response to a second touch operation, and
       switch to a second display mode, which is different than the cursor display mode, in response to a third touch operation which is different than the second touch operation.

11. The electronic device according to claim 10, wherein the second display mode is an enlargement/reduction mode in which a display region of the display screen is enlarged or reduced in response to respective touch operations.

12. The electronic device according to claim 10, wherein, in the second display mode, one or more display targets are displayed, and wherein the at least one processor executes one of the one or more display targets when selected by a selection operation.

13. The electronic device according to claim 12, wherein the selection operation comprises moving a continuous touch of the second touch operation and releasing the continuous touch of the second touch operation at a position on the display that corresponds to one of the one or more display targets.

14. The electronic device according to claim 10, wherein the first touch operation begins on an edge of the display and moves inward in a first direction on the display.

15. The electronic device according to claim 14, wherein the at least one processor cancels the selection mode in response to a touch operation that begins on an interior of the display and moves outward in a second direction, which is opposite to the first direction, towards the edge of the display.

16. The electronic device according to claim 14, wherein the at least one processor cancels the selection mode in response to a release of the first touch operation.

17. The electronic device according to claim 10, wherein the second touch operation comprises maintaining a continuous touch of the first touch operation while moving a contact point of the continuous touch of the first operation in a first direction on the display, and wherein the third touch operation comprises maintaining the continuous touch of the first touch operation while moving the contact point of the continuous touch of the first operation in a second direction on the display which is different from the first direction.

18. A non-transitory storage medium readable by a computer that stores a control program that controls an electronic device comprising a display and a touch panel, the control program configured to cause the computer to, in a cursor display mode in which the display displays a cursor:
    during a continuous touch operation that moves a contact point across the display, move the cursor on the display, such that the movement of the cursor is greater than the movement of the contact point, for as long as the continuous touch operation is not released;
    when the contact point of the continuous touch operation remains motionless for a non-zero predetermined time period,
       display an image, comprising an enlarged portion of a display screen surrounding the cursor on the display, in a foreground of the display so as to overlap the display screen as a background of the display, and
       reduce a luminance of the display screen as the background, so as to be visually darker than the image, comprising the enlarged portion of the display screen, in the foreground; and,
    when the continuous touch operation is released while a location of the cursor corresponds to a location of a display target on the display, execute processing related to the display target.

19. A method for operating an electronic device comprising a display and a touch panel, the method comprising, in a cursor display mode in which the display displays a cursor:
    during a continuous touch operation that moves a contact point across the display, moving the cursor on the display, such that the movement of the cursor is greater than the movement of the contact point, for as long as the continuous touch operation is not released;

when the contact point of the continuous touch operation reciprocates within a predetermined time period, displaying an image, comprising an enlarged portion of a display screen surrounding the cursor on the display, in a foreground of the display so as to overlap the display screen as a background of the display, and reducing a luminance of the display screen as the background, so as to be visually darker than the image, comprising the enlarged portion of the display screen, in the foreground; and, when the continuous touch operation is released while a location of the cursor corresponds to a location of a display target on the display, executing processing related to the display target.

* * * * *